United States Patent [19]

Samburg

[11] 4,023,139

[45] May 10, 1977

[54] SECURITY CONTROL AND ALARM SYSTEM

[76] Inventor: Gene Samburg, 1206 Stable Gate Court, McLean, Va. 22101

[22] Filed: Oct. 24, 1974

[21] Appl. No.: 517,768

[52] U.S. Cl. .......................... 340/147 R; 340/274 R; 340/409; 340/420; 179/2 A

[51] Int. Cl.² ..................... G08B 19/00; H04Q 9/00

[58] Field of Search ........... 340/149 R, 151, 164 R, 340/147 R, 147 MD, 214, 409, 416, 420, 411, 274; 179/2 A, 5 P

[56] References Cited

UNITED STATES PATENTS

| | | | |
|---|---|---|---|
| 3,662,112 | 5/1972 | Martin | 179/5 P |
| 3,686,668 | 8/1972 | Durkee | 340/420 |
| 3,733,430 | 5/1973 | Thompson et al. | 178/5.1 |
| 3,735,396 | 5/1973 | Getchell | 340/409 X |
| 3,757,301 | 9/1973 | Regan et al. | 340/420 X |
| 3,772,667 | 11/1973 | Falck, Jr. | 340/416 X |
| 3,812,492 | 5/1974 | Gotanda | 340/420 X |
| 3,814,841 | 6/1974 | Ulicki | 340/149 R |
| 3,820,074 | 6/1974 | Toman | 340/151 |
| 3,820,102 | 6/1974 | Schubert | 340/214 X |
| 3,821,733 | 6/1974 | Reiss et al. | 340/409 |
| 3,838,395 | 9/1974 | Suttill, Jr. et al. | 340/149 R X |
| 3,842,208 | 10/1974 | Paraskevakos | 179/2 A X |
| 3,848,241 | 11/1974 | Le Nay et al. | 340/411 X |
| 3,854,122 | 12/1974 | Cross | 340/151 |
| 3,858,193 | 12/1974 | Bach | 340/164 R X |
| 3,865,984 | 2/1975 | Ewing | 179/2 A |

*Primary Examiner*—Donald J. Yusko
*Attorney, Agent, or Firm*—Staas & Halsey

[57] ABSTRACT

A security control and alarm system includes a central station communicating with each of plural remote stations, or facilities, protected by the system. The remote stations may be multi-zone office buildings, shopping centers, or any of various specialized applications. The central station provides point-to-point monitoring of each protection sensor device at each remote station. Protection sensors of any desired type are encompassed by the system, including detectors for unauthorized entry, fire, smoke, mechanical equipment failure and the like. The central also provides remote control of various security functions including selective arming and disarming of the remote station, resetting of the alarm condition following an alarm activation, operating doors to permit access to authorized personnel, operating elevators to restricted, selected floors of a building, any of various other types of desired control functions. The system also may provide general remote control of non-security building functions. Communication between the central and remote is provided by an FSK-type multiplex mode of communication over standard voice grade telephone lines. Each person authorized to gain access to a remote, protected facility is provided a password. At the entrance of the facility, there is provided a telephone with a direct line connection to the central. An individual wishing to gain access must call and give the correct password to an operator at the central in response to which the operator issues a control to the remote facility for unlocking the entrance door. Elevator control is performed on the same basis. Parity check and general system test, in addition to various system operation monitoring and tamper detection means assure reliable operation of the system.

19 Claims, 16 Drawing Figures

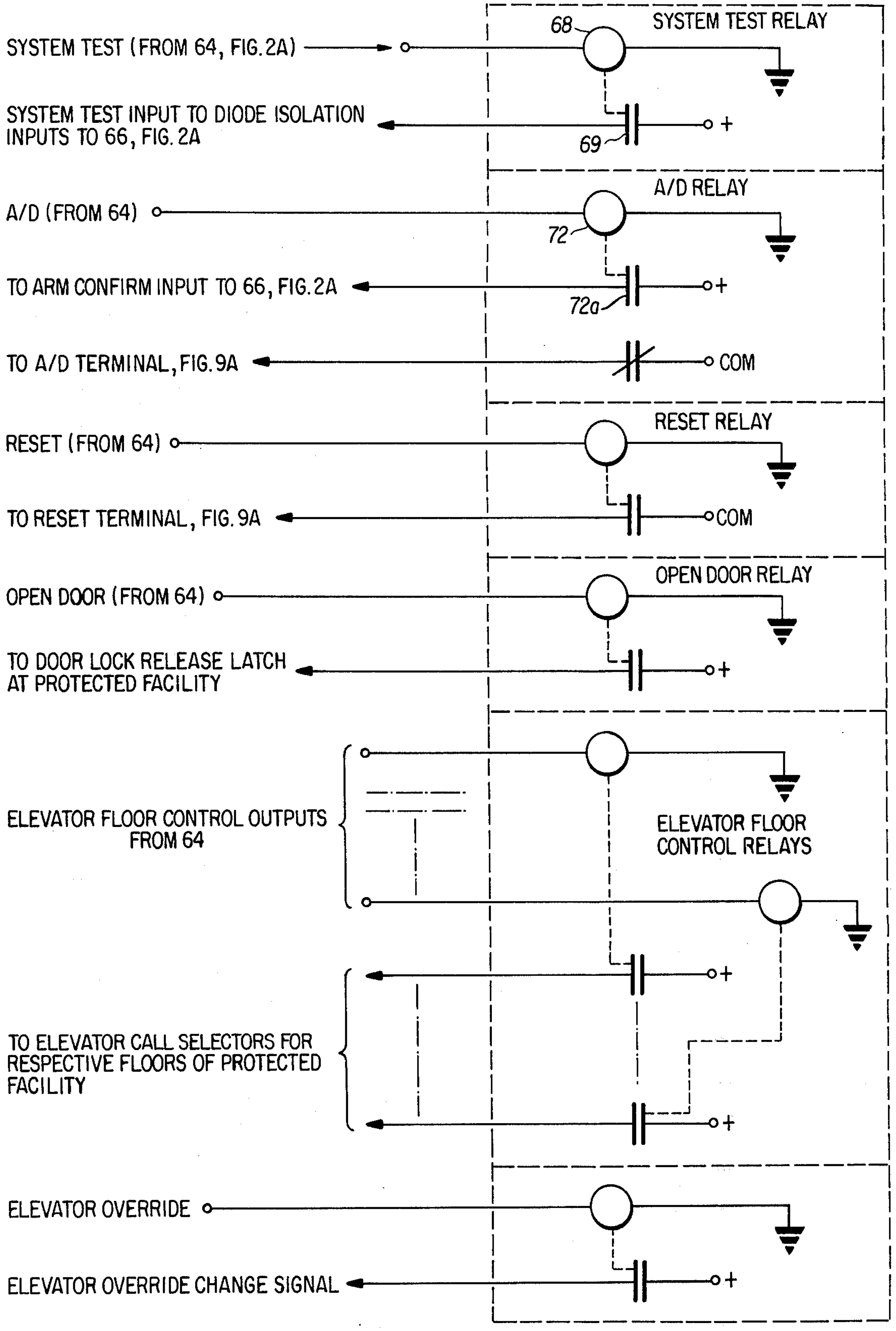
FIG. 2B CONTROL RELAY PANEL 34

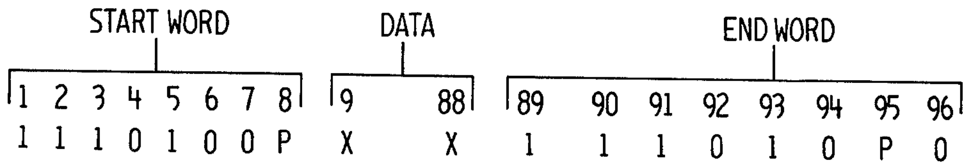
FIG.3
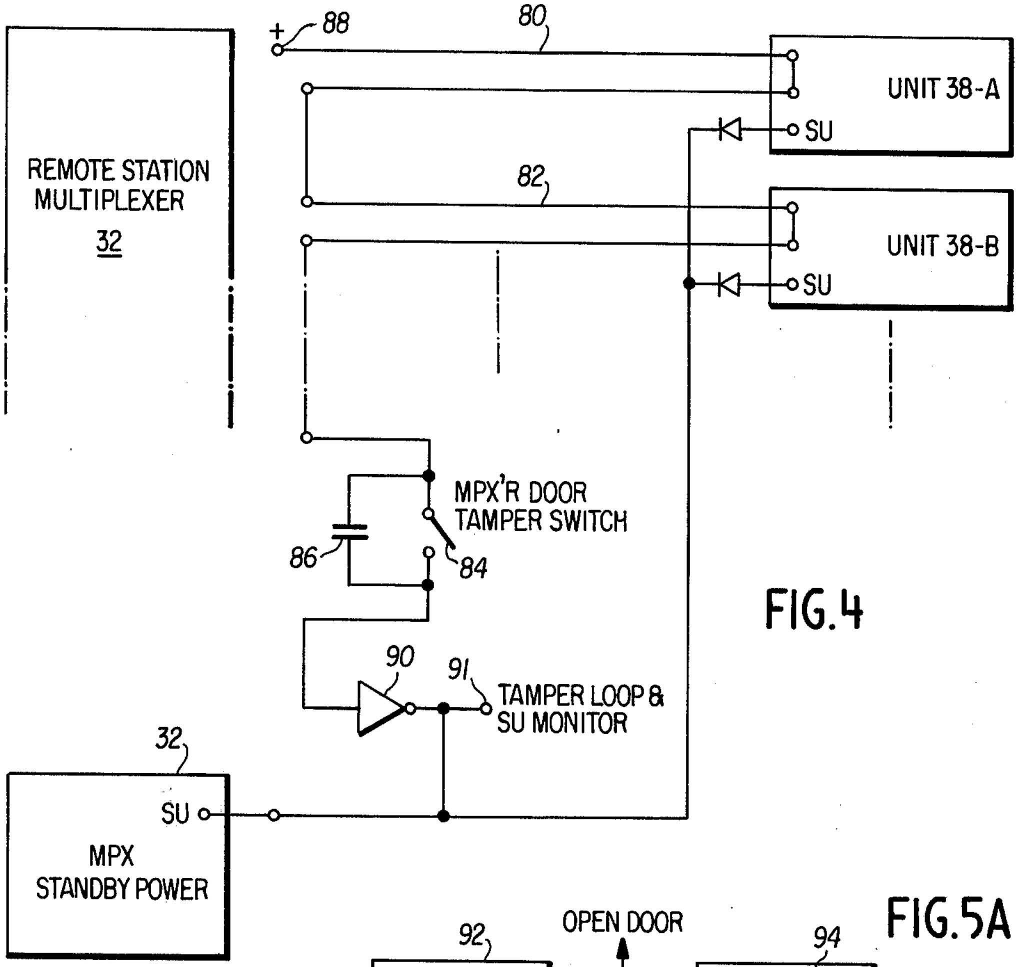
FIG.4
FIG.5A
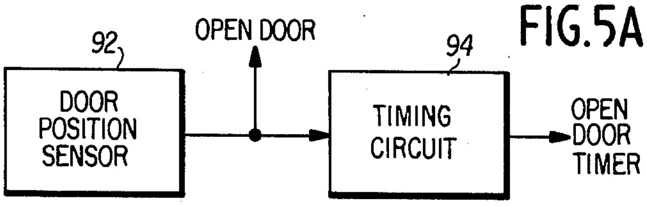
FIG.5B
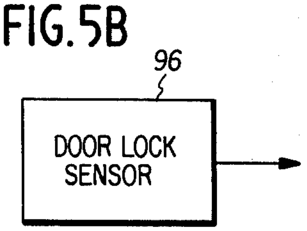
FIG.6
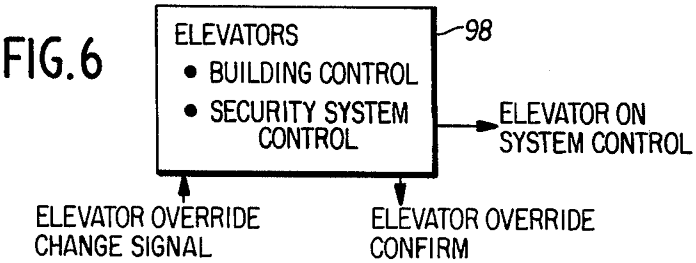

SECURITY CONTROL AND ALARM SYSTEM

BACKGROUND OF THE INVENTION

1. Summary of the Invention

This invention relates to a security control and alarm system and, more particularly, to such a system wherein a central station communicates with and provides point-to-point monitoring and control function for each remote facility protected by the system.

2. Description of the Prior Art

As is well known, a substantial and urgent need exists for protecting the security of buildings and in turn the possession of the occupants of buildings against illegal breaking and entering and burglary. The need is especially extreme in the case of office buildings in major metropolitan areas, not only in the United States, but in foreign countries as well.

The most rudimentary form of protection, yet one which is extremely costly, is the provision of security guards who are stationed in the building during the non-business hours. Typically, a sign-in and sign-out list is provided for those individuals to sign upon entering and later upon leaving the building. The inadequacies of such a system are well known and do not require explanation.

In the past, efforts have been made to automate such security and monitoring functions through the use of electronic equipment. To date, the majority of these systems have proven to be either ineffective or too costly to provide a meaningful, practical solution to the problem, suitable for widespread use.

The attention directed to this need, however, has resulted in defining and outlining certain mineral criteria which must be met in the design of an effective security system. For example, the system must be capable of restricting entry into the building to authorized personnel only, and of detecting an unauthorized entry into a suite of officies within the buidling belonging to a given tenant. Detection of the unauthorized entry, of course, serves to detect the intended theft of expensive office equipment such as typewriters, electronic calculators and the like, vandalism, or other improper actions intended by the one making the unauthorized entry. It is both critical and apparent that the system design be reliable so as to assure the detection and, as well, so as to minimize and indeed totally eliminate if possible the occurence of false alarms. Reliablity also indicated that personnel of the protected premises have minimal participation in activating or controlling the system. Acceptability of the system moreover dictates that a minimum of inconvenience to the tenant be presented. Since the costs of initial installation and subsequent maintenance of the system are critical determinants in its widespread acceptability, it is necessary that the system design be as simple as possible while affording the requisite monitoring control and alarm functions with a sufficient degree of reliability and flexibility.

As noted, prior art systems have failed to satisfy one or more of these various requirements. A significant obstacle which the prior art has not overcome is the fact that, as is typically the case in commercial office buildings, individual suites must be cleaned nightly by a staff or cleaning or char-people employed by the owners/manager of the office building. These cleaning staffs necessarily are permitted access to the suites after business hours and thus require and are given master keys for operating the normal door locks and gaining access to the suites which they service. The presence of these cleaning personnel presents probably the largest single obstacle in establishing an effective security system for this type of premises.

In the typical prior art systems, a passkey is required to disarm an alarm circuit which otherwise serves to indicated unauthorized entry. Such systems cannot be effective since such passkeys, as well as a master door lock key, must be provided to the char-people as well. The dilemma thus is presented that the distribution of passkeys to the cleaning personnel has at least the potential of destroying the security intended to be afforded by the passkey; alternatively, not distributing the passkeys would result in the cleaning personnel triggering the alarms every time they entered a suite after business hours to perform their normal cleaning functions.

Prior art systems typically require that the tenant personally activate, or arm, the system at the end of business hours upon leaving the office. The tenant also must remember to deactivate, or disarm, the system at the start of the next business day. It is unrealistic to expect that each of the various tenants in a given protected facility will remember without fail to perform these activating and deactivating functions. The result is that the alarm system frequently is not activated and remains ineffective or, alternatively, is not deactivated at the beginning of the next business day, resulting in false alarms. In any event, such prior art systems present a distinct inconvenience which most tenants find objectable. Regarding the false alarm condition, it as well should be recognized that the problem typically is encountered that the alarm system cannot be readily accessible for deactivation once set off by an unauthorized entry. Hence, where a tenant through forgetfulness does not deactivate the system prior to entry, even though in the period of normal business hours, and thus sets off a false alarm, he may not have the ability to shut off the alarm. This problem is even further compounded where only selected personnel of a given suite of offices are to be provided with a passkey to enter and leave after normal business hours. In that instance, on an ensuing business day, if such an authorized person has forgotten his passkey, or is not the first to arrive, entry into the suite by a person who is otherwise properly there during business hours would set off the alarm and there would be no means to terminate the false alarm.

The prior art has attempted to deal with the false alarm situation by providing silent alarms. This has only compounded the problem, since the authorized personnel is not aware of his improper entry. Such systems also are restricted to the silent alarm condition at all times.

These and numerous other problems have not been satisfactorily solved by prior art security systems. As a result, the costly, yet ineffective approach of having private guards sit in the lobbies of office buildings and other such facilities throughout the non-busines hours and continued to be the principal means of providing this monitoring function.

SUMMARY OF THE INVENTION

Accordingly, it is an object of this invention to provide a security control and alarm system for each of plural, remote protected facilities which is monitored and controlled solely by a central station and permits elimination of private guards at each remote facility while affording greatly improved security monitoring, alarm, and control functions.

it is yet another object of this invention to provide a security control and alarm system wherein a central station provides for point-to-point monitoring and control of detection and alarm conditions at each of plural remote facilities and wherein the various remote facilities may be any of a number of different types of buildings or other specialized applications requiring any of various types of monitoring, alarm and control functions.

Still a further object of this invention is to provide a security and alarm system affording any desired type of remote control functions at any of a number of remote locations serviced by the system.

It is a further object of this invention to provide a security control and alarm system which is low in cost, both as to initial installation and routine operation thereafter, and which is highly reliable and effective in operation.

These and other objects of the invention will become apparent in the following.

The security control and alarm system of the invention includes a central station which communicates with each of the remote stations protected by the system over a suitable data communication link. Preferably, multiplex communications are employed with suitable modems for transmission over voice grade telephone leased lines between the central and each remote station. Each remote station includes at least one master control unit which provides the monitoring of various security sensors provided in the facility being protected. These sensors may comprise switches for detecting opening of doors, fire detectors, smoke detectors, ultrasonic motion detectors, and the like. Normally, the master control unit at the protected facility is in a standby or disarmed condition during normal business hours. At a prescribed time at the close of each business day and typically on weekends, the remote station system is placed in its armed condition. This is accomplished by a control transmitted from the central station and suitably recognized at the remote station. When so armed, the master control unit of the remote station is thereby enabled to detect any unauthorized opening of doors or other outputs from the other sensors. When a sensor output indicates a violation of the protected premises, the master control unit at the remote actuates a suitable alarm. An alarm indication signal also is supplied to the multiplexer for transmission to the central station. Receipt of the alarm indication at the central station results in alerting the appropriate authorities. The central station has a control for terminating the alarm condition at the remote after suitable steps have been taken to alert authorities or the like. At the remote, only authorized personnel have the ability to reset the alarm for their own suite, when improperly activated. By so restricting the ability to reset the alarm condition at the remote station, the system eliminates the possibility of an unauthorized person who has entered the premises finding the control unit and resetting the alarm to leave the impression that the alarm was inadvertently activated.

The system also provides for multiplex transmission of various controls to the remote station, as may be required at a given facility. A significant one of these controls is the ability to gain access to the facility proper, such as to gain access through the major entrance doorway of an office building. Consideration of this aspect leads conveniently to a discussion of a practical implementation of the system as employed for protecting a typical office building.

At the close of business hours, building supervisory personnel lock the exterior entranceways to the building, and report this to the central station by a telephone tie-line. Locking of the outside entrances, of course, could be automated, but in practice is not deemed necessary. The individual suites are not armed at this time, since cleaning personnel must have access to the suites. When the cleaning is completed, building personnel again call the central and state that the building now should be armed. After the building is locked, anyone wishing to gain entrance to the building must call the central station on a telephone provided for that purpose at the exterior of the building. Each such person is provided with a secret password, which may be a code number, which he must repeat over the telephone to the central station. If the password is correctly given, the central station by remote control unlocks the outside entrance and the caller is permitted to enter the building. The system also provides for elevator control; a telephone is provided at the elevator, communicating over a tie-line to the central station. The caller must again give his password and then specify the floor to which he wishes to travel. The central station then transmits a control word to the remote station which controls the elevator to deliver the caller to the designated floor. The controlled exterior doors of the building furthermore are provided with a time control detector for detecting when such doors are open for more than a prescribed interval, such as a minute or a minute and a half. If the door is open longer than this period, the time control detector produces an alarm indication signal which is supplied to the multiplexer for return to the central to indicate this condition. The door being open in excess of the predetermined period implies that the door has been propped open to permit rapid removal of stolen merchandise from the building; hence, the central station interprets this as an alarm condition and reports the same to the appropriate authorities.

The master control unit at each protected facility includes provision for monitoring a number of separate zones within the building. As many zones as desired may be provided, with concomitant increase in the amount of equipment employed in a given facility to provide the desired monitoring and control functions. For convenience of description, let it be assumed that the security function which is monitored is unauthorized opening of doors of the individual suites within a given office building. Each door to a protected suite is provided with a door open dectector. Typically, a single main entrance door also is provided with a key lock switch or digital pushbutton panel, the purpose of which is to enable personnel who are authorized to be on the premises after normal business hours to disable, or shunt, the door open detectors. The key lock switch accordingly has a "secure" position, at which the detectors, i.e., protection sensors, are operative and an "access" position at which the detectors are shunted, and thus inoperative. Thus, a person who is authorized to be on the premises, having gained access to the building and then having been delivered to the designated floor, through use of his passkey in the key lock switch or by actuation of a digital pushbutton panel in accordance with a memorized code number, switches his local system from "secure" to "access" and disables the door open detectors thereby to gain access to his premises without producing an alarm. The access position of the switch produces an access indication which is transmitted to the central station. The central station of course is aware of the individual having access to the building, by virtue of operating the door and elevator controls for delivering that individual to a designated floor. The individual also may be required to designate the suite to which he will be going, the access indication thus confirming his arrival. Further, if that tenant should depart from the suite, leaving it in the access condition, this will be noted at least as of the next business day at the central station when the system is disarmed. An operator will then call the remote, protected facility and advise the tenant to return the key switch to the secure condition.

An authorized individual who neglects to switch the system to "access" from "secure" when entering a suite after business hours, thereby accidentally triggering the alarm, may reset the alarm by inserting his passkey and turning the switch to the access position, thereby disabling the detection and alarm circuits. One making an unauthorized entry, triggering the alarm, would not have a passkey and thus could not disable the alarm circuits. In the instance of unauthorized entry, resetting of the alarm system is accomplished by the central station, after the alarm has been generated for a sufficiently long period and the incident has been reported to the appropriate authorities.

The system permits numerous modificationa and adaptations to special requirements. For example, portions of a building may be constantly armed so that even during normal business hours, entry without use of the passkey or the like will cause an alarm condition. Disablement of the local alarm may also be provided through a very simple expedient, thereby not to alert the person making the unauthorized entry that his presence has been detected.

Numerous safety precautions are implemented in the system to detect tempering and system malfunctions. For example, the key switch box for each suite includes a tamper switch having normally open contacts, which are closed only when the box is properly mounted adjacent the protected suite. Should a burglar attempt to remove the box, with the intent of disabling the alarm in some manner, the temper switch opens immediately and an alarm indication is generated. Alarm indications as well are generated in response to tempering with the housings for other system components and in response to cutting of interconnecting cables. Finally, a "system test" is implemented to assure that all of the data points of the multiplexer are properly transmitting through to the central station.

In addition to the protection or security monitoring functions thus afforded, the system of the invention additionally can provide for numerous remote control operations. For example, a suitable control at the central station can be transmitted for actuating a responsive relay at the remote station which could serve any of a number of purposes, such as turn-on or turn-off of heating units, electrical lighting, or the like, at any desired time.

The system of the invention thus provides automated monitoring and control of numerous protection and other functions of a remote station, which is highly reliable and versatile, yet is of reasonable cost both for initial installation and subsequent operation. Particularly, the cost of the system is much less than the far less effective practice of having guards posted in buildings to monitor these same functions. The central station, moreover, may be fully automated under computer control if desired to provide any or all of the security and control functions as above described.

BRIEF DESCRIPTION OF THE DRAWINGS

FIG. 2B is a detailed block diagram of a control relay panel at the remote station responding to various controls transmitted from the central;

FIG. 3 illustrates the format of multiplex waveforms transmitted between the central and remote stations;

FIG. 4 is a schematic of tamper loop and power supply supervisory circuits providing security sensing conditions at the remote station;

FIG. 5A is a block diagram of an open door timer sensing device employed at the remote station;

FIG. 5B is a block diagram of a door clock sensor device employed at the remote station;

FIG. 6 is a block diagram of a sensor device employed at the remote station for confirming that elevators are under the security system control;

DETAILED DESCRIPTION OF THE INVENTION

Figure 1:
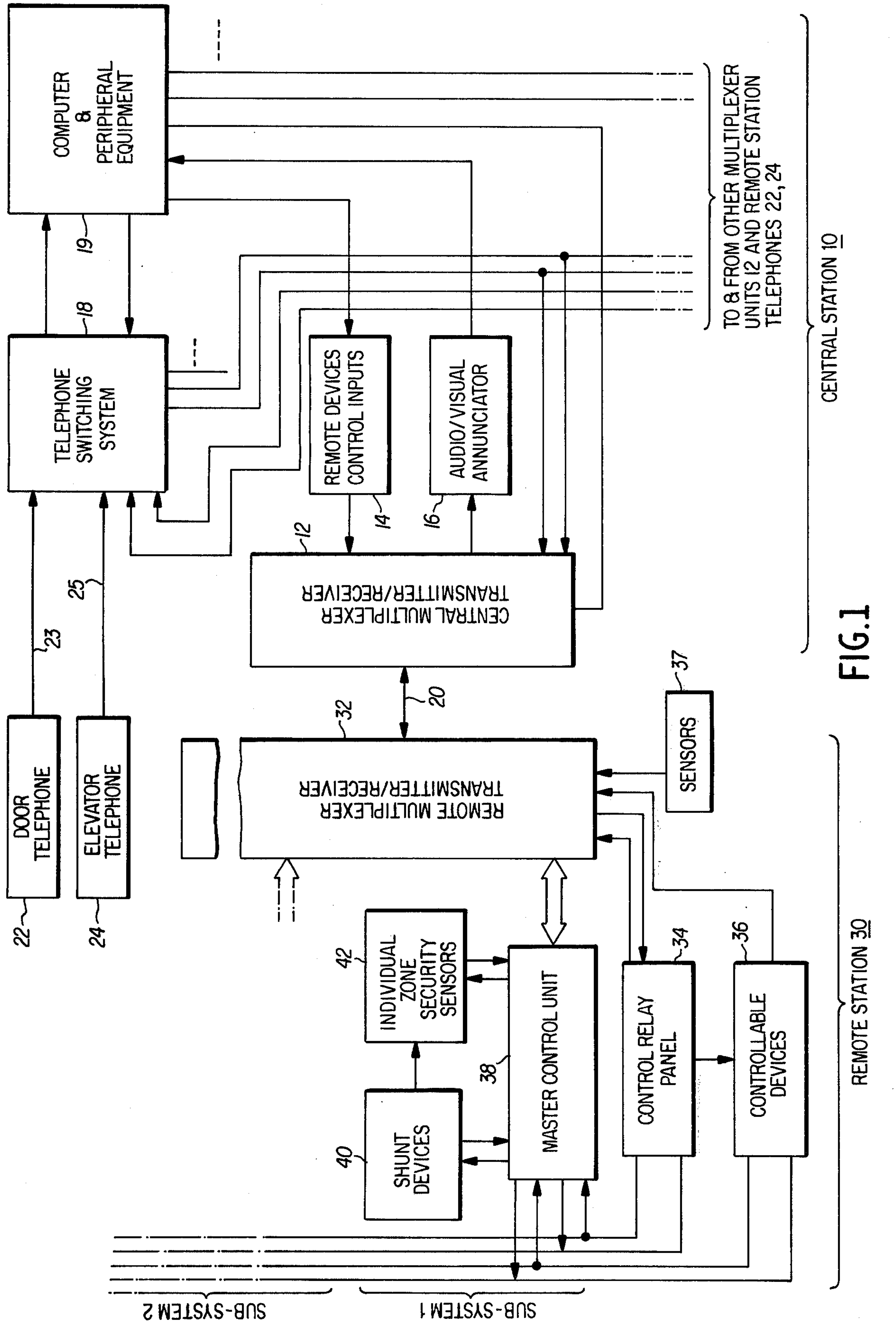
FIG. 1 is a basic block diagram of the security control and alarm system of the invention, including a central station and one of a plurality of remote stations monitored at and controlled by the central station.

FIG. 1 is a basic block diagram of the security control and alarm system of the invention. A central station 10 communicates over a data communication link 20, which may comprise a leased telephone line, to a remote station 30. In an actual embodiment of the system, full duplex communications are performed by frequency shift keyed (FSK) modulation of frequency-separated carriers over a single pair of voice grade, leased telephone lines. Data derived from the monitoring function is time division multiplexed and transmitted from the remote station 30 to central station 10, through FSK modulation of a carrier, for example at 1875 cycles; simultaneously, control information is time division multiplexed and transmitted from the central station 10 to the remote station 30 by FSK modulation of a frequency displaced carrier, for example at 2250 cycles. Those skilled in the art of course will appreciate that numerous alternative communication systems are available to perform the requisite communication functions.

As set forth in the Summary and discussed in more detail hereafter, a control feature of the system of the invention is that all exterior entrances to the building are locked at the end of business hours. To gain access to the building, an individual must know a secret password or code number and must call on a phone connected through a direct tie-line to the central station and communicate that password. Block 22 indicates such a door phone with a tie-line 23 communicating with the central station 30. The central station can also control the elevators in an office building and for this purpose a separate elevator phone 24 and tie-line 25 are provided for the user to call the central station, thereby to identify the password and designate the floor to which he wishes to go. In both instances, the central station then transmits suitable controls to the remote station for that building to open the entrance door to the building and to control the elevator to travel to the designated floor, respectively.

The principal components of the central station 10 comprise a multiplex receiver/transmitter 12 for transmitting data over and receiving data from the lines 20, remote control inputs shown generally by block 14, for selecting controls for transmission to the remote station 30, and an audio/visual annunciator 16 which provides both audible and visual indications of the monitoring and other functions performed at an associated remote station 30.

A telephone switching system 18 communicates with the multiplex receiver/transmitter 12 and with a computer and related peripheral equipment, generally indicated in block 19, the latter providing for fully automated, computer control of the central station functions. In this regard, the computer and peripheral equipment block 19 also receives data from the multiplex receiver portion of block 12 and from the audio/visual annunciator 16 and, in response to programmed system controls and the data derived from the monitoring functions and supplied thereto, produces outputs to the telephone switching system 18 and to the remote devices control panel 14, each in turn supplying controls as above discussed to the transmitter 12 for transmission over lines 20 to the remote station 30.

The computer also may store the data received and prepare a printed record.

The control functions, generally, include door open and elevator floor selection, arm and disarm of the security system, and system test. In the system test, test signals are applied to each of the multiplexer points for transmission to the central. The central can detect whether any multiplexer point is not transmitting properly and, if so, repairs can be initiated. A reverse test also is performed by transmitting test levels at all multiplex points from the central to the multiplexer at the remote; where a signal at any point is not received, an alarm condition on a designated multiplexer point at the remote is re-transmitted to the central.

Although alternative arrangements are possible, in practice a multiplexer 12, control input means 14, and an annunciator 16 are provided for each remote station, whereas the telephone switching system 18 and computer 19 are used in common for all. Further, a separate communication link 20 is provided from each central station multiplexer 12 to its associated remote station 30.

The remote station 30 includes as principal components a multiplexer transmitter/receiver 32, a control relay panel 34, various controllable devices indicated by block 36, a master control unit 38 and shunt devices 40 and individual zone security sensors 42. The receiver portion of block 32 receives multiplexed FSK modulated signals from the transmitter 12 of the central station 10, as above noted, for supply to the control relay panel 34 which in response thereto controls the appropriate controllable devices of the block 36. The master control unit 38 is central to the operations of the remote station 30, as will become apparent. The shunt devices 40 correspond, for example, to any suitable tenant operated switch device, such as a key-actuated switch or a digital lock panel, which permits authorized personnel, for example, to shunt or bypass the alarm response of the security system by switching from the "secure" to "access" position, thereby to gain access to the premises after business hours without triggering the alarm. As before noted, numerous functions may be monitored by the system, and accordingly, block 42 is labelled only generally to designate individual zone security sensors, which may be any of various types.

For practical design purposes, it is desirable to provide a modular implementation for the master control unit 38, whereby a given such unit accommodates a prescribed number of zones, for example, ten zones. A single unit 38 thus provides ten independently monitored and controlled zones, or sections, of a building or other protected facility. If a given installation requires more than ten zones, then a suitable number of the control units 38 and associated units 40 and 42 are employed, each conveniently designated as a further subsystem. FIG. 1 thus illustrates inputs and outputs from the multiplexer 32 to other such subsystems for a given protected facility. Since typically a single building is serviced by a single multiplexer, it will be appreciated that the control relay panel 34 and the controllable devices 36 are employed in common for all of the subsystems. The total number of individually monitored zones is limited to the capacity of the multiplexer transmitter/receiver 32 and, specifically, to the number of bit positions available in the multiplex waveform. If the number of zones in a given building exceeds the available bit positions of a single multiplexer, an additional multiplexer and an additional leased line can be added, as required. These factors, of course, are merely matters of design.

It is to be understood that the technique of multiplexing and transmission and reception over a leased telephone line, per se, forms no part of the present invention. Rather, the implementation of these functions may be afforded through any of numerous techniques well known in the art.

It is somewhat convenient at this juncture to describe the various control functions which are performed. The multiplexer-receiver 32 receives the controls from the central station, and provides suitable individual outputs corresponding to each control so received. Control relay panel 34 includes a plurality of relays associated with each control, and which are energized selectively when the received multiplex waveform includes a signal corresponding thereto. The relays of the panel 34 when so selectively energized close their contacts to perform the corresponding control function, such as the arm/disarm operation of the master control units 38, reset of an alarm condition, and the system test operation. Controls which are common to a given building include unlocking of the entrance door to the building, as well as the control of an elevator to a designated floor, all as discussed above.

Sensor block 37 includes various sensors common to the building. For example, a timer for detecting a door open condition in excess of a prescribed limit, such as one minute, produces an output supplied to the multiplexer and particularly to an alarm point thereof to indicate this condition at the central. When the system controls the building elevators after business hours, the necessary changeover of control must be performed at the building and a confirmation signal indicating that the security system now is in control of the elevator likewise is supplied from unit 36 to the multiplexer-transmitter 32 for transmission to the central. Other similar indications can be provided, such as a confirmations signal that exterior doors to the building have been locked.

Figure 2A:
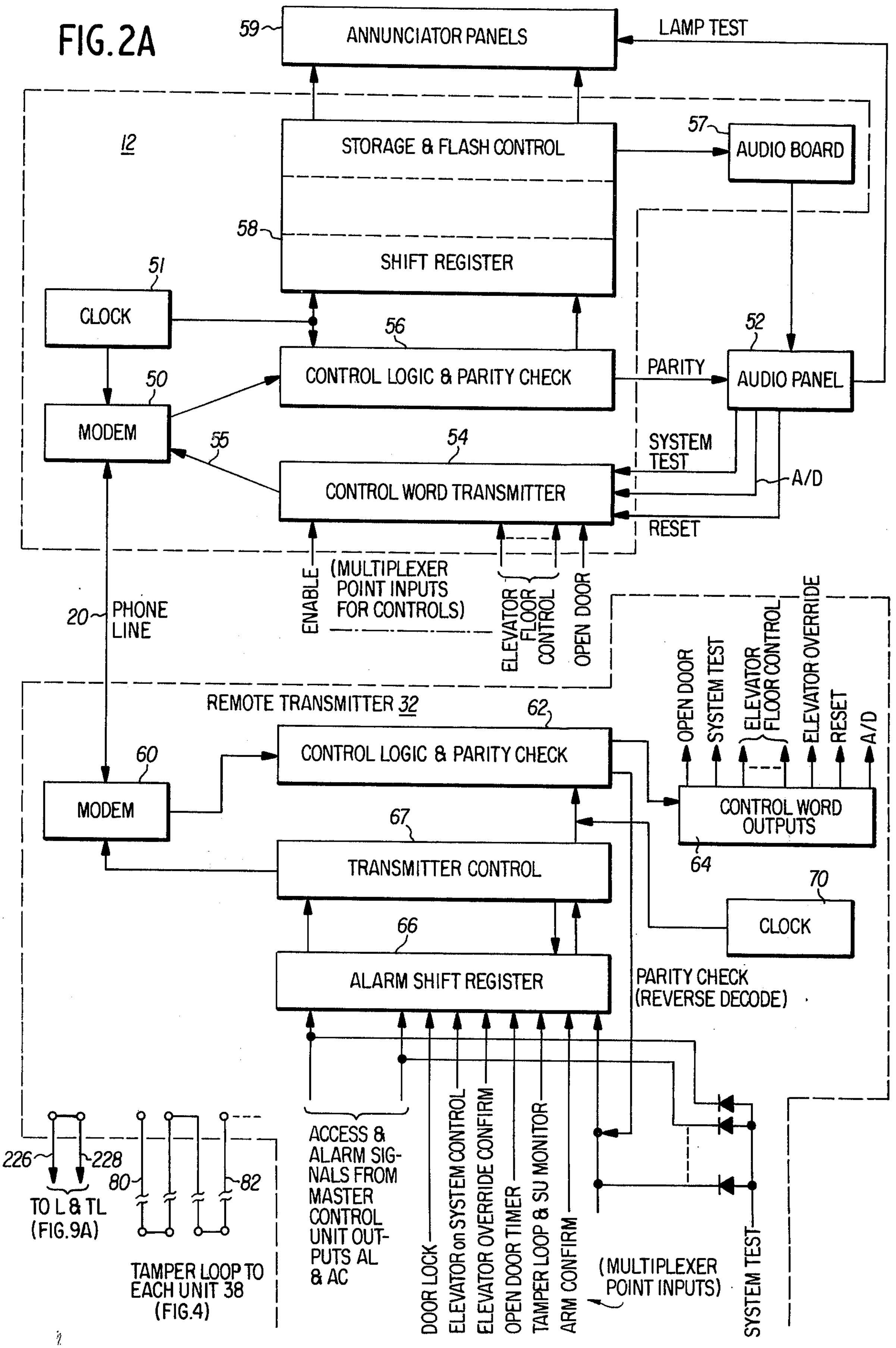
FIG. 2A is a detailed block diagram of multiplexer transmitter/receivers of the central and remote stations, illustrating the communication of monitored protection sensing conditions and controls therebetween.

Schematic block diagrams of the multiplex receiver/-transmitters 12 and 20 of the central and remote stations, respectively, are shown in FIG. 2A. These are not limiting, and alternative data communication systems may be employed in the alternative. As before noted, full duplex communication over line 20 is provided by frequency separation of the carriers of the respective modems 50 and 60 of the central and remote multiplex receiver/transmitter units 12 and 20, respectively.

In the central unit 12, the various controls to be selectively transmitted to a receiver are shown as inputs to the control word transmitter 54; the enable input is discussed later. Actuation of pushbuttons on audio panel 52 selectively produce the controls indicated, whereas the remainder are produced by the telephone switching system 18. The control word transmitter 54 responds to the control inputs to generate a pulse in a corresponding assigned time slot of a multiplex waveform, supplied over line 55 to the modem 50. Modem 50 modulates its carrier in accordance with the data of the multiplex waveform and transmits to the remote receiver 32.

Transmissions received from the remote on the letter's separated carrier frequency are demodulated by the modem 50 and supplied as a digital multiplex waveform to control logic and parity check unit 56. Unit 56 performs a parity check on the received multiplex signal and if in error, either immediately as to a given, received, multiplex transmission, or after a prescribed number of erroneous transmissions, produces an output "PARITY" to audio panel 52 to indicate error. This error may arise from any of faulty data transmission by the remote transmitter's multiplexer, loss of carrier at the remote, or failure of the central station receiver. If parity is satisfied, the received, multiplexed data bit outputs are supplied from unit 56 to unit 58 and particularly to corresponding stages of a shift register portion thereof for storage. Each successively received multiplex word updates the storage. Unit 58 further includes drive circuits for driving indicator lights of an annunciator panel 59, for display of the received data. The annunciator panel is shown in more detail in FIG. 7.

Figure 7:
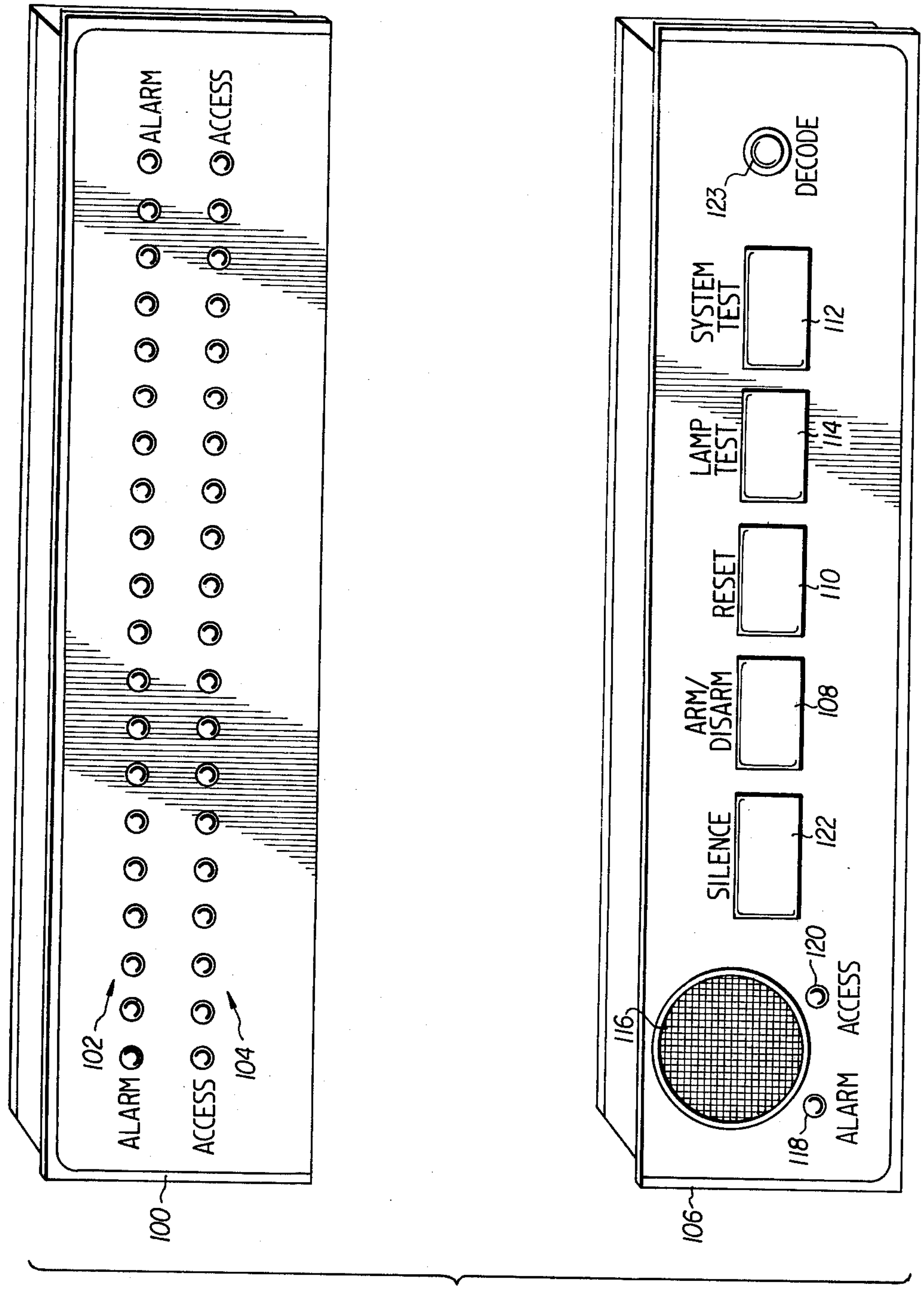
FIG. 7 is a perspective view of annunciator and audio panels associated with a given controls station and provided at the central for monitoring the status of conditions at the remote and for transmitting certain contrrols to the remote.

Unit 58 also supplies access/alarm outputs to an audio driver 57 which drives corresponding audio and visual indicators on an audio panel 52, also shown in more detail in FIG. 7. A clock 51 controls the timing of operations of the various components, in usual fashion.

The remote multiplex transmitter/receiver 32 includes a modem 60 similar to modem 50. Modem 60 demodulates a received transmission from the central and supplies the demodulated digital multiplex waveform thereof to a control logic and parity check circuit 62. The unit 62 may comprise a shift register, the outputs of which, corresponding to pulses in the preassigned time slot positions of the multiplex waveform and thus to prescribed controls from the central, are supplied to a control word output unit 64. Unit 64 may include a storage register corresponding to each assigned time slot of the multiplex waveform, and thus to respectively corresponding controls represented by receipt of pulses in those pulse positions. The content of unit 64 thus is updated with each newly received multiplex waveform. These outputs drive the relays of the control relay panel 34 of FIG. 1, shown in more detail in FIG. 2B.

FIG. 2B shows illustrative relays and contacts of the panel 34 (FIG. 1) for various of the control word outputs of unit 64 (FIG. 2A). The system test output from 64 energizes a relay 68 to close its corresponding contact 69 and supply a positive power potential at output ST. Note in FIG. 2A that the System Test (ST) is applied in common through diode isolators to each multiplex point input of register 66. This applies a positive potential at each point, thereby testing whether each multiplexing point is generating its corresponding indication at the central. As also illustrated, each of the inputs to the register 66 from the normal system circuits is isolated through diodes.

Data from each of the one or more master control units is supplied in parallel to corresponding inputs of a shift register 66. Additional inputs to the register 66 include the "tamper loop and SU" (supervisory) monitor signal, an "open door timer" signal, an "elevator on system control"signal (indicating that the elevators have been switched over to control by the security system), a "reverse decode" signal, and a "door lock" signal.

A system clock 70 of the same bit rate as the clock 51 synchronizes operations of the components of the transmitter/receiver 32.

FIG. 3 is a plot of an illustrative multiplex word format such as is communicated between the central and the remote stations. The word comprises an 8-bit start word and an 8-bit end word with provision for 80 data bits therebetween. The inputs to register 66 (FIG. 2B) for such a word format would be 80 in number. The transmitter control 67 adds the start and end bits to the word for supply of the composite multiplex word to modem 69.

In conventional fashion, the start and end words provide proper synchronization of system sub-components and thus proper receipt and interpretation of data. A parity check is performed in each of the systems 12 and 32 in response to each received multiplex word. At the central multiplexer 12, a loss of parity provides a suitable indication to the panel 52, as discussed above. Loss of parity at the receiver unit 32 as well produces a similar output. However, since the receiver is typically unmanned, a loss of parity indication at the receiver is not useful; hence, this condition is reported back to the central by tying the parity check output from unit 62 to a further predesignated point of the register 66.

As will be made clear, each zone protected by the system provides an access indication output to indicate that the zone has been properly changed from secure to access, and an alarm condition output to indicate activation of a sensor, as caused for example by improper entry onto the premises. For a multiplex waveform containing 80 data points, this would correspond to 40 such zones each having an access and an alarm condition output, for a total of 80 points. As indicated in FIG. 2A, however, certain of the multiplex points are employed for alternative purposes, e.g., tamper detection and control monitoring functions.

In a typical installation, the multiplexer is included in the telephone room, as normally is provided in an office building. The master control units 38 are distributed throughout the building in conjunction with the zones with which they are associated. To detect any tampering with, and especially cutting of, the cable joining each master control unit 38 and the multiplexer 32, a tamper detection pair of wires 80 and 82 are included in that cable, as illustrated in FIG. 4. These pairs 80, 82 are jumped or shorted together at the respective units 38 and the plurality of pairs are wired into a series circuit at the multiplexer.

A multiplexer door tamper switch 84 is closed when the access door for the multiplexer cabinet is closed. If an intruder attempts to open the cabinet door, switch 84 opens. A key operated switch 86, when properly operated by authorized personnel with a passkey, bypasses the door tamper switch 84. Switch 84 conveniently is included in series with the tamper circuit loops from a positive power supply terminal 88 through an inverter 90 to output terminal 91. Should AC power fail at either the remote multiplexer receiver/transmitter 12 or at any of the master control units 38, local battery power maintains operations thereof, producing a SU (supervisory) output, indicating this condition. The SU outputs are supplied in common to output terminal 91. Hence, any tampering with the series loops or the cabinet door, resulting in breaking the series circuit, or an SU output, results in an alarm condition level output at terminal 91. From FIG. 2, this is transmitted to the control to indicate the alarm condition whereby the condition is investigated and/or corrected, as needed.

The "open door timer" input in FIG. 2A is shown in block diagram form in FIG. 5A and comprises a door position sensor 92, the output of which energizes a timing circuit 94 which in turn produces the "open door timer" output after a prescribed delay interval of a minute, or a minute and one half, for example. The time period is selected to permit normal entrance and exit through a controlled door of the building, while detecting the condition that the door is ajar, such as would indicate a burglar removing items from the building. If desired, the output of the sensor 92 could be utilized directly to indicate at the central every time the door is opened, although in practice this is not deemed necessary. Likewise, if desired, a door lock sensor 96 shown in FIG. 5B may be provided to supply an input to register 66 for confirming at the central that supervisory personnel in the building have locked the exterior doors at the close of business hours.

The building supervisor also switches the elevators from the normal building control to the security system control, resulting in an output from unit 98 of FIG. 6 confirming the latter, for supply to unit 66 of FIG. 2A.

As shown in FIGS. 2A, 2B and 6, the remote building typically manually sets the elevator to security system control, although the central system could perform this function remotely. However, when done manually, it may be desirable to return elevator control to normal operation. For this purpose, an elevator override control is transmitted to the remote to shunt the security system controls, and to produce a confirmation signal thereof for return to the central. A circuit such as the key access switch circuit can provide this function.

In relating FIG. 2A and FIG. 1, it will be understood that the annunciator panel 59 and the audio panel 52 of FIG. 2A correspond to the audio/visual annunciator of FIG. 1.

FIG. 7 illustrates, in somewhat exploded view, display panels at the central station which are associated with each of the remote stations protected by the system. Panel 100 includes a top row 102 of alarm lights and a bottom row 104 of access lights, each vertically aligned pair of alarm and access lights corresponding to a given zone at the remote station. Whereas FIG. 7 illustrates twenty such alarm and access light pairs corresponding to twenty zones, additional panels 100 for greater numbers of zones may be provided. Panel 100 corresponds to the annunciator panel 59 of FIG. 2. Switching of a remote zone to "access" lights the corresponding indicator lamp 104; a sensed "alarm" condition lights the corresponding indicator 102.

The bottom panel 102 corresponds to the audio panel 52 of FIG. 2. A two-position, latching arm/disarm button 108 is manually actuated to a first stable position to produce a continuous arming signal and to a second stable position to produce the disarming signal, labelled as the A/D, i.e., arm/disarm, control provided from panel 52 to the transmitter 54 of FIG. 2A. A reset button 110 and a system test button 112 are momentary actuation, two-position switches, for generating the reset and system test controls, respectively. Unit 14 of FIG. 1 encompasses these controls. The lamp test button 114 provides a steady current through diode isolators to the indicator lamps 102 and 104 of panel 100 to assure that they are operating properly.

A speaker 116 is energized selectively to produce two different tones, one corresponding to sensing of an access change and the other to sensing of an alarm condition at the remote. When the remote system is switched from "secure" to "access," the change is indicated by a flashing access light 120 and a tone from speaker 116. A change back to "secure" produces the same result. Silence button 122 stops the audible indication and the flashing of lamp 120, but the zone access indication lamp 104 of panel 100 remains lit for that zone. In the case of an alarm, light 118 flashes and a different tone is produced. Silence button 122 again terminates these indications while the alarm light 102 of panel 100 remains energized.

The decode indicator 123 is lighted in response to lack of parity, as determined at the central by control logic and parity check unit 56 of FIG. 2, above discussed.

Each of the lamp pairs 102 and 104 is permanently assigned to a zone, or to the various other conditions supplied as direct inputs to the shift register 66 of the remote, as seen in FIG. 2, and previously discussed.

Figure 8:
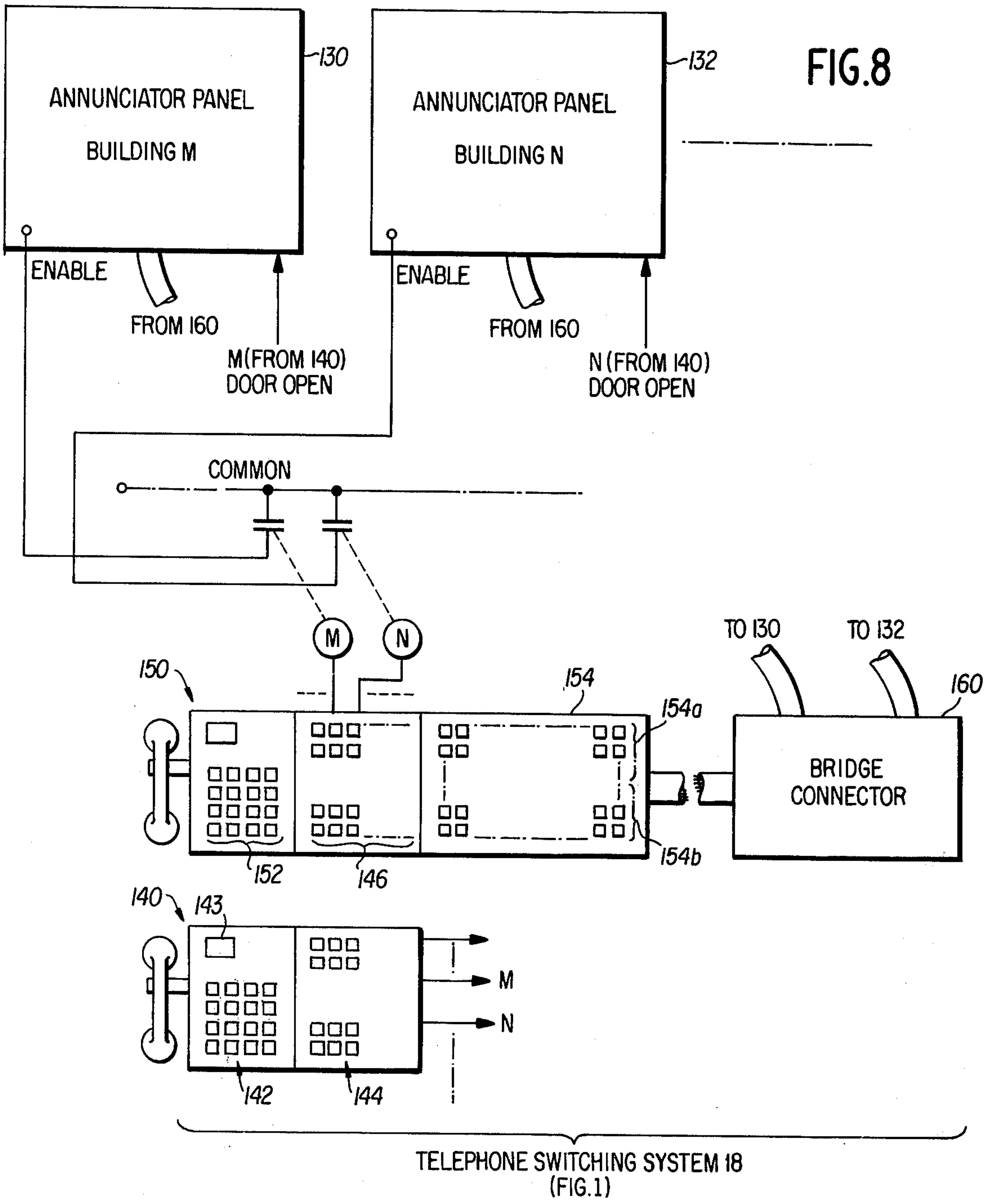
FIG. 8 is a detailed block diagram of the telephone switching system included at the central station for communicating with the remote stations and selectively providing controls thereto.

FIG. 8 comprises a block diagram of components of the central station providing the door open, elevator floor, and enable control inputs to the transmitter 54 in FIG. 2A. Each building has a corresponding multiplexer transmitter/receiver panel 12 of FIG. 1, as shown at 130 and 132 in FIG. 8 for buildings M and N. The telephone switching system 18 of FIG. 1 is conveniently implemented by a first call director unit 140 associated with the door phone 22 of FIG. 1 and providing a door open control, and a second telephone call director 150 associated with the elevator phone 24 of FIG. 1 and providing the elevator floor control. Each of the call directors includes the usual pushbutton arrangement 142 and 152 and line selector buttons 144 and 146, the latter individually corresponding to the buildings, such as M and N, encompassed within the system. The elevator control call director 150 further includes a pushbutton selector unit 154 having a first group 154*a* of control buttons for selection of the floor to which an elevator is directed, and a second group 154*b* which can provide any other desired control function, such as turning lights on and off and the like at the remote station. Control signals from the pushbuttons 154 are supplied in parallel to a bridge connector 160 and through corresponding parallel connectors, in parallel to each of the multiplexer panels, such as 130 and 132.

When the elevator phone in a given building is used to request elevator control, the incoming call lights the corresponding one of the pushbuttons 146 which, upon depression, transmits an enable signal to the corresponding multiplexer panel for that building. When the caller gives his password and specifies the floor, the appropriate floor button 154*a* is depressed. The control signal for that floor is supplied from the bridge connector 160 in parallel to all multiplexer panels, as shown for 130 and 132. However, only that panel receiving the enable signal is enabled to transmit the control in its multiplex word to its corresponding remote building.

The door open function is more readily implemented. In response to a call from a door phone of FIG. 1, the corresponding button 144 lights and is depressed, thereby to select the building from which the call was placed. When the caller provides the password, button 143 is depressed, the door open control is transmitted, and the lock on the door is released, to permit the caller to enter.

Figure 9A:
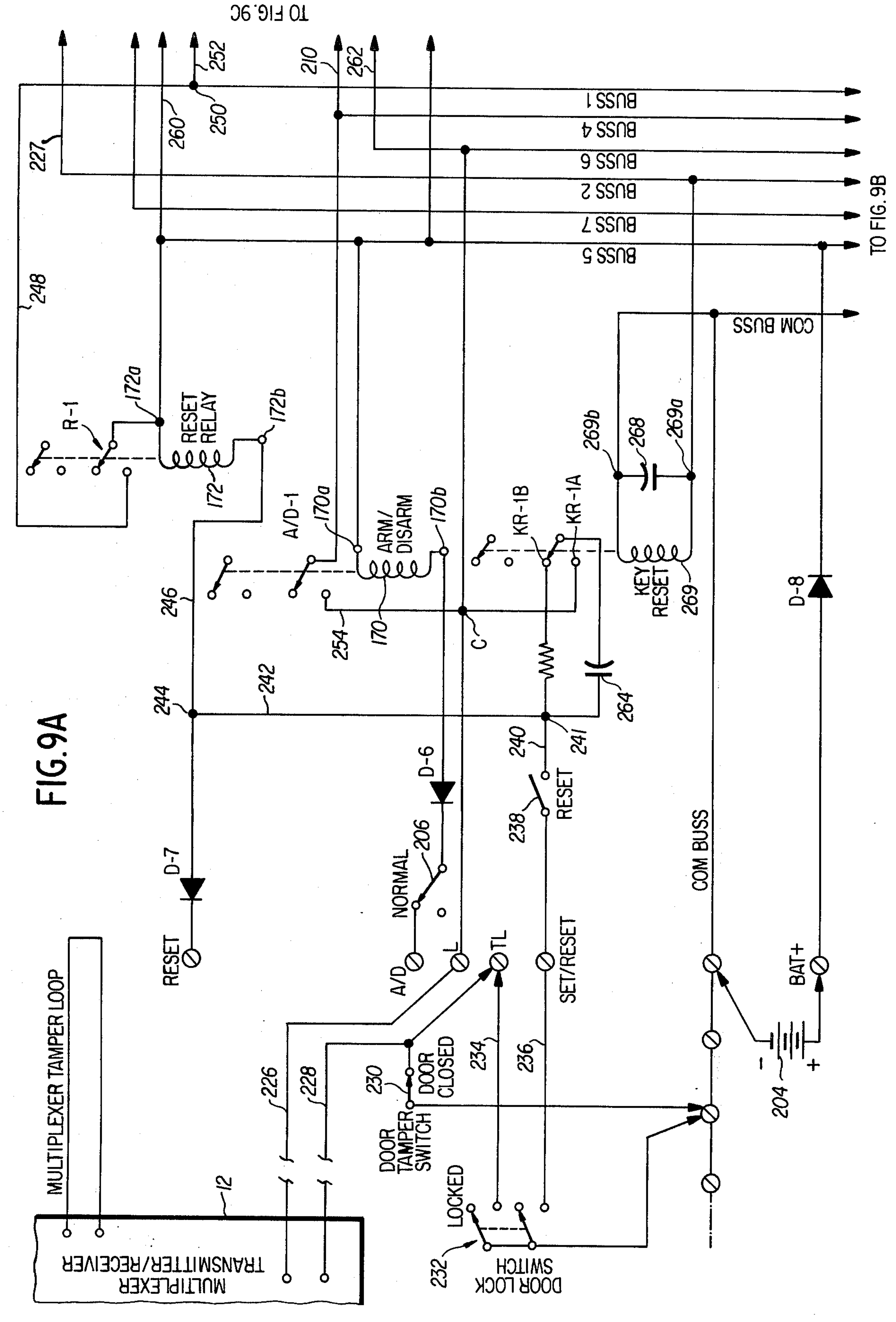
FIGS. 9A, 9B and 9C, taken together, comprise a schematic of a master control unit at the remote station station and of two representative zones serviced by a given master control unit.
Figure 9B:
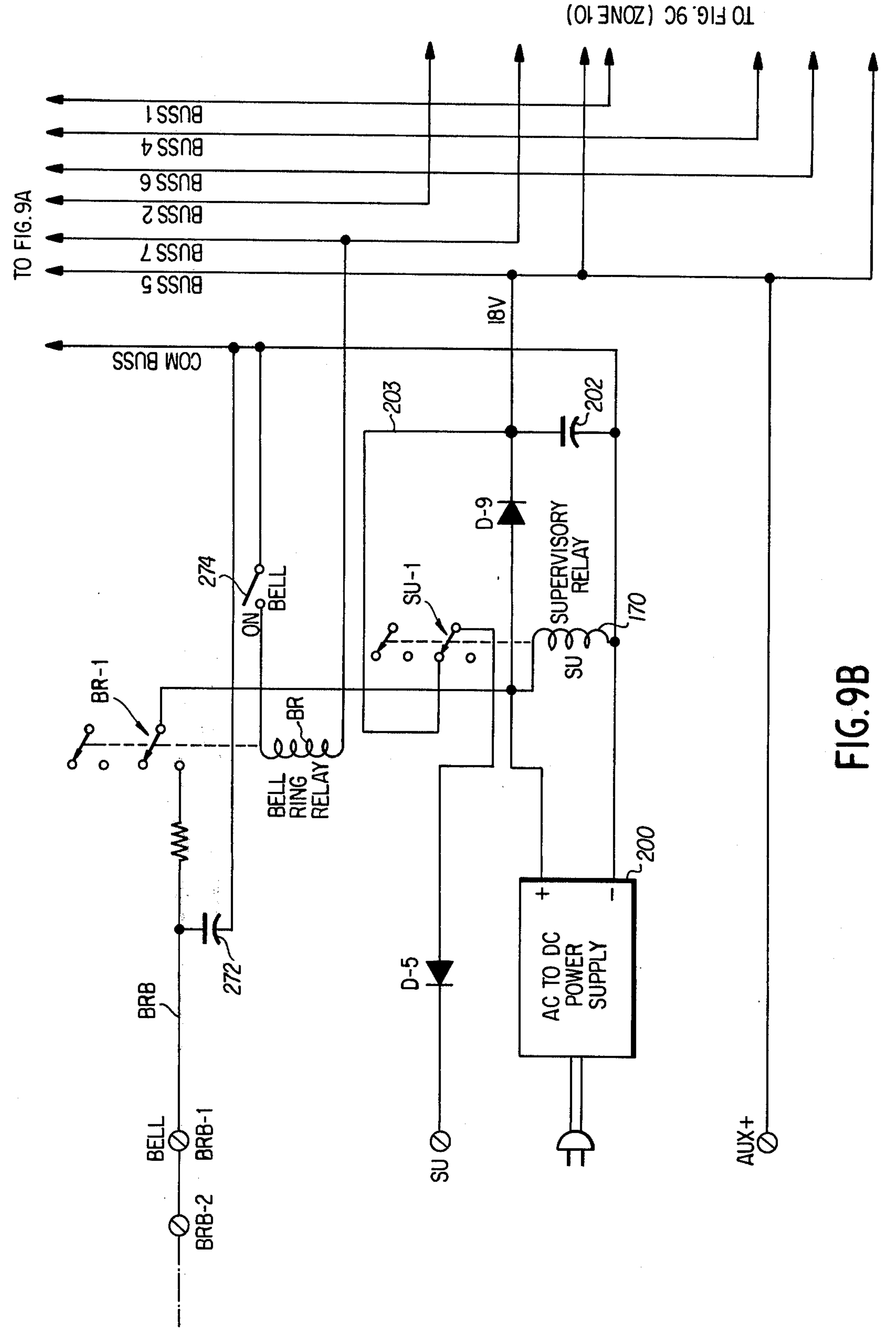
Figure 9C:
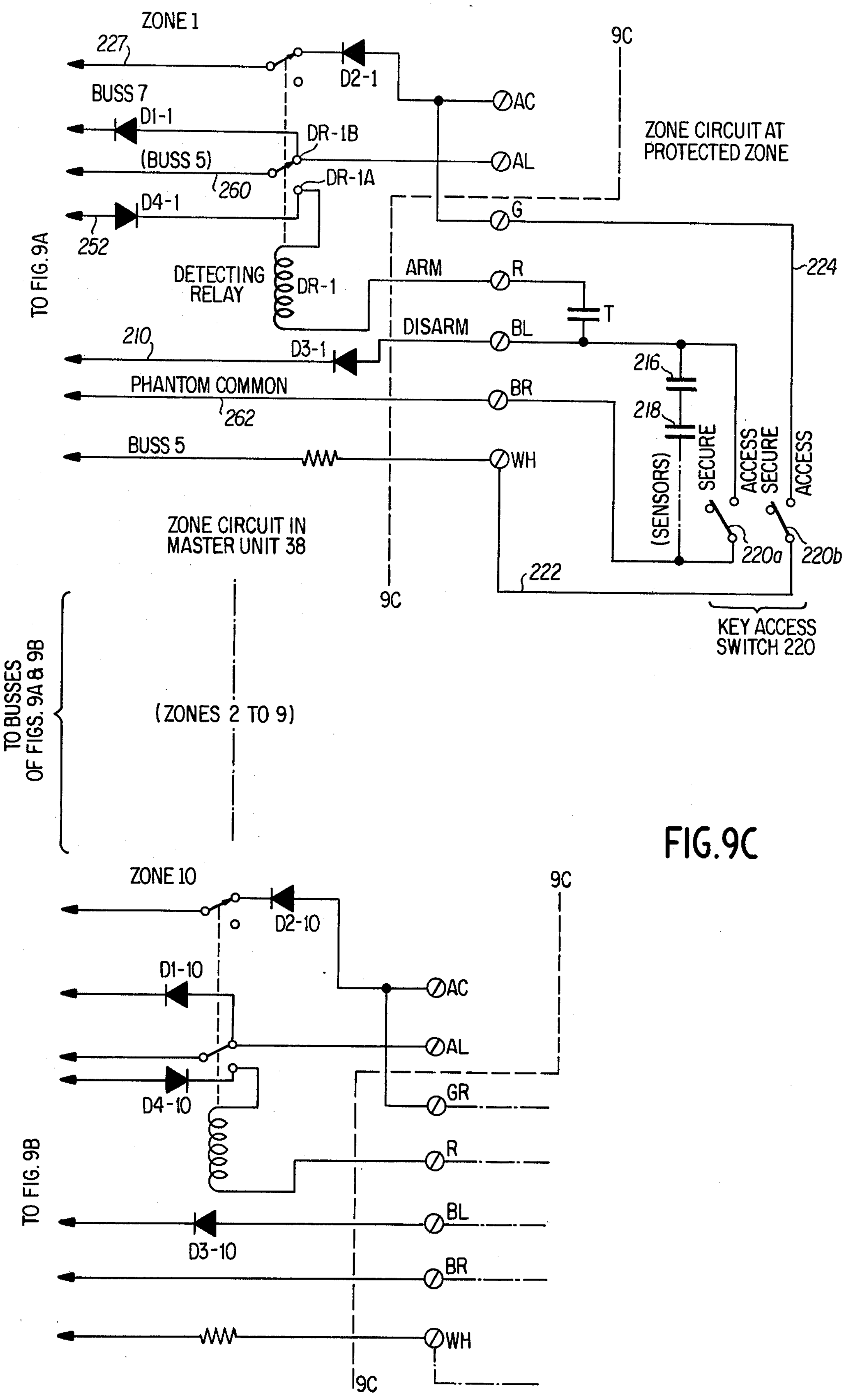

FIGS. 9A and 9B comprise a schematic of those portions of the central control unit 38 of FIG. 1 which are common to all of the zones associated with that unit and FIG. 9C illustrates the circuits of two representative zones. As noted, ten zones may be controlled by a single unit 38. Power supply 200 is conventional and provides a steady state DC voltage, illustratively of from 14 to 18 volts, on its outputs. The positive power supply voltage output is supplied through diode D9 to buss 5 and the negative, or common, voltage output is supplied to the common buss COM BUSS. Capacitor 202 functions as a smoothing filter.

Standby power is supplied by battery 204 through isolation diode D8 to energize buss 5 in the event of a failure of the power supply 200. When supply 200 is operative, diode D8 isolates the battery 204.

Coil 170 of a supervisory relay SU is connected across the outputs of supply 200 and thus is energized in normal operation to maintain open its normally closed contacts SU-1. In the event of power failure, contacts SU-1 close. The batter power supply output is supplied over buss 5, line 203, the closed contact SU-1, and isolation diode D5 to the supervisory output terminal SU. As before discussed (FIG. 4), this supplies an alarm indication to the remote transmitter (FIG. 2A) for transmission to the central.

Referring now to FIG. 9A, buss 5 is connected to terminal 170*a* of coil 170 of an arm/disarm relay and terminal 172*a* of coil 172 of a reset relay. Terminal 170*b* of the arm/disarm coil 170 is connected through diode D6 and a switch 206 to a terminal A/D which normally is connected to common through a line connecting that terminal to the control relay panel 34 (see FIG. 2B and the normally closed contacts 72*b* associated with the A.D. relay 72). As a result, the arm/disarm relay is energized in the disarmed condition of the control unit 38 and closes its normally open contacts A/D-1. Contacts A/D-1 of the arm/disarm relay, when closed, complete a circuit over line 254 to junction C and thus between busses 4 and 6. From FIG. 9C, the security sensors 216, 218 . . . for the zone being protected are connected in series circuit between the BL and BR terminals by leads 212 and 214. The sensors may be of various types such as fire sensors, ultrasonic motion detectors, door operated switches and the like. The sensors are wired so as to complete the series circuit between BL and BR when in the non-detect state. In FIG. 9C, the portion of each zone circuit to the left of line 9C—9C is in the housing of the master unit 38 and only the portion to the right thereof is located physically at the protected zone. The cable joining the zone sensors and switch T and the key access switch thus is seen to be tamperproof, since cutting thereof will open the energizing circuit for detecting relay DR-1, just as does activation of a sensor or opening of switch T, and produce an alarm. In the disarmed state, the circuit completed by contacts A/D-1 jumps terminals BL and BR through lines 210 and 262 and thus shunts the protection sensors 216, 218 . . . . In the armed state, contacts A/D-1 are open and only the sensors complete the circuit between BL and BR. Detection of an alarm condition by any of the sensors therefore opens the circuit between BL and BR. This produces an alarm indication, as will be described.

Arming of the control unit 38 thus requires de-energization of the arm/disarm relay and opening of its contacts A/D-1, so that the protection sensors are effective in the circuit between terminals BL and BR.

In FIG. 9C, note that terminal BL is connected through a tamper switch T to terminal R. Tamper switch T is included in a junction box, containing the key access switch, mounted adjacent to a monitored entrance door to the zone being protected. This switch is closed when the junction box is properly mounted on the wall — an effort to tamper with the junction box, by removing it from the wall, opens the switch T and thus open-circuits the terminals R and BL. Absent this condition, the switch T is closed and terminals R and BL are connected together.

A dual contact access key switch 220 includes a first contact 220*a* connected in shunt across the series-connected sensor switch contacts 216, 218 . . . and a second contact 220*b* connected in a series circuit of line 222 and line 224 between the WH terminal and the GR terminal. A positive power supply voltage is present at all times at the WH terminal. The open position of key access switch 220 corresponds to "secure" and the closed position, in which the security sensors are shunted by the closed contacts 220*a* is the "access" condition. In "access, " a positive voltage is supplied through the closed contacts 220*b* from the WH terminal to the GR terminal AC-1. Thus, the switch 220 can shunt the sensors and switch to "access," producing an "access" indication output regardless of the armed or disarmed state of the unit.

Still referring to FIG. 9C, the detecting relay including coil DR-1 and contacts DR-1A, B, and C, is energized at all times, once the system is initiated, except when an alarm condition arises. This requires that contacts DR-1A be closed to supply power over line 260 from buss 5 (FIG. 9A and B) through the coil DR-1 and terminals R, BL and BR and through line 262 to buss 6 and junction C (FIG. 9A) which moreover must be at ground, or common. The foregoing has described completion of the circuit as to terminals R, BL and BR, the sensor 216, 218 . . . , the key switch 220 and as to the arm/disarm contacts A/D-1 jumping contacts BL and BR. The remainder of that circuit for energizing the detecting relay is now discussed. As will be made clear, energization of the detecting relay requires a reset operation, for purposes which will become clear.

Referring again to FIG. 9A, the reset relay includes normally open contacts R-1 to which the positive supply voltage is supplied. As previously discussed, a pair of leads extend from master control unit 38 to the multiplexer for a given remote station as a tamper detection provision. These leads are connected between the terminals L and TL, and are shown at 226 and 228; they extend to the multiplexer where they are simply jumped as seen in FIG. 2. The leads 226 and 228 in conjunction with the jumper directly connect terminals L and TL. Tampering with the interconnecting cable so as to cut either of leads 226 and 228 open circuits terminals L and TL to provide an alarm indication, to be described.

A door tamper switch 230, when closed, connects terminal TL to the common buss COM. This switch 230 is closed when the access door to the master control unit 38 is closed. Tampering with that door to open it will open switch 230 and generate an alarm, to be discussed. For normal maintenance access to the unit 38, a bypass function is provided by a door lock switch 232 which, through its contacts and leads 234 and 236, connects the TL terminal and the set/reset terminal to the common buss COM. Actuation of switch 232 to its unlocked position then bypasses the door tamper switch 230 to maintain common on terminals TL and set/reset. Finally, a reset switch 238 is provided for maintenance functions such that when closed, common is applied to line 240 and thus to junction 241 and through line 242 to a junction 244. Junction 244 also connects through diode D7 to a reset input terminal R.

Junction 244 also is connected to lead 246 to terminal 172*b* of the reset relay coil 172.

When a master control unit 38, as shown in FIGS. 9A to 9C, is initially installed, door lock switch 232 is actuated to its unlocked position to complete the connection of leads 234 and 236 to common. Door tamper switch 230 is now bypassed and the door may be opened. When wiring is completed, to initialize the system, reset switch 238 is closed. This supplies common potential from lead 236 and through lead 240, junction 241, lead 242, junction 244 and lead 246 to the reset coil terminal 172*b*. Coil 172 is now energized, and contacts R-1 then close. This connects contact DR-1A of the detecting relay to line 260 on which positive voltage is supplied from buss 5. The circuit may be traced from contact R-1 through lead 248, junction 250 and lead 252 and diode D4-1 to contact DR-1a of the detecting relay DR-1. Assuming switch T between the R and BL terminals is closed, an energizing circuit is then completed through the detecting relay coil DR-1, from terminal R to terminal BR, and through lead 262 to buss 6, and, in FIG. 9A, through lead 263 to junction C. The latter is at common, as above discussed.

As a result, detecting relay DR-1 is energized and closes its contacts DR-1A. The detecting relay then remains energized over the circuit from the positive buss 5 through lead 260, its coil DR-1, and line 262 to junctiion C and thus to the common buss. Relay DR-1 remains continuously energized until a total power failure occurs or until an alarm condition arises. In general, an alarm condition causes termination of energization of coil DR-1 with the result that contact DR-1A opens and contact DR-1B closes, thereby supplying a positive voltage from line 260 to the alarm output terminal AL.

The foregoing has explained the initialization of the master control unit. The system at this state is not in an armed condition with respect to the normal protection sensor functions. However, note that a circuit must be completed at all times between terminals R and BL to assure continued energization of the detecting relay. Thus, terminals R and BL are effectively permanently armed. Thus, any additional detectors as desired may be connected in series with the switch T between the terminals R and BL. Hence, within a given zone, a mamimum security area may exist which is under permanent armed condition.

The usual arming function next is considered. Recall again that the arm/disarm relay coil 170 of FIG. 9A is energized in the disarmed condition of the master unit. Contact AD-1 therefore is closed and, through the circuit previously described, terminals BL and BR are jumped, or shorted, shunting the sensors 216, 218.

Arming of the system requires de-energizing the arm/disarm relay. This is performed by the A/D control from the central which serves, in FIG. 2B, to energize the A/D relay coil 72 and thereby open the normally closed contacts 72*b*. The A/D output therefore is switched from common to an open circuit. The A/D terminal in FIG. 9A likewise is switched from common to an open circuit and the arm/disarm relay coil 170 is de-energized and its contact A/D-1 opens to the position indicated in FIG. 9A. The shunt connection across the terminals BL and BR therefore is removed. As a result, completion of the circuit between terminals BL and BR, as is necessary for continued energization of detecting relay coil DR-1, for the "secure" position of switch 220, requires that the series-connected contacts of the various sensors 216, 218 . . . between BL and BR be closed.

Thus, in the secure position of switch 220, all of the protected doors of a given zone must be closed to provide continued energization of the detecting coil DR-1. Should one of the switches 216, 218 . . . open, as may result from an unauthorized entry, the circuit between terminals BL and BR opens, and the detecting coil DR-1 is de-energized. Contact DR-1B closes (i.e., the normal position thereof as seen in FIG. 9C) and applies the positive voltage on line 260 to the alarm output terminal AL.

The positive potential at terminal AL is applied to unit 66 of the remote multiplexer-transmitter (FIG. 2A) for transmission to he central, to indicate the alarm condition.

From the preceding description of the energizing circuit for coil DR-1 of the detecting relay, it will be appreciated that any of the tamper detection functions also will cause de-energization of coil DR-1 and hence an alarm condition. For example, cutting of the cable joining circuit 38 to the multiplexer cuts the tamper loop of leads 226 and 228 and opens circuit terminals L and TL (FIG. 9A); opening of the door of the master unit, opens tamper door switch 230 (FIG. 9A); removing the key lock switch box opens switch T (FIG. 9C); cutting of the cable joining the zone sensors to master unit 38 -- all serve to de-energize the detecting relay coil and produce an alarm. As can be seen, cutting of either of the wires labelled ARM and DISARM will de-energize DR-1 for that zone, even if the system is disarmed, and if armed, cutting of either the ARM wire or the wire 262 will produce that same zone alarm.

When the alarm condition occurs, the detecting relay is deenergized, as noted, and the contact DR-1B is closed, as shown in FIG. 9C. The positive voltage on lead 260 is applied through diode D2-1 to buss 7, and through lead 270 to terminal 271*a* of coil 271 of a bell ring relay. Terminal 271*b* is connected to the COMMON buss, and thus the relay is energized and closes its contacts BR-1, supplying positive potential to a bell ring buss BRB. Any desired number of alarm indicating devices may be connected to that buss in accordance with the terminals BRB-1, BRB-2 . . . . Capacitor 272 is a ripple filter for buss BRB. Switch 274 is normally closed, and is opened to disable the alarm at the remote, such as for maintenance operations.

A significant feature of the invention is that the alarm condition cannot be reset merely by correcting, or removing, the condition which triggered the alarm. For example, merely closing a door which triggered the alarm cannot terminate the alarm. Instead, the system must be reset, either from the central or by a key reset operation at the remote, the latter by switching of the reset key switch 220 to the "access" position, as where an authorized user has inadvertently triggered the alarm.

When the intrusion, or other sensed condition, which triggered the alarm terminates or is corrected, the central, having alerted proper authorities, can reset the system and terminate the alarm by transmitting a reset control word to the remote. The reset control from the central produces a reset control word output from unit 64 in FIG. 2A to which the control relay panel 34 (FIG. 2B) responds to switch the reset terminal from open circuit to the common voltage level. Coil 172 of the reset relay in FIG. 9A thus is energized. Coil DR-1 of the detecting relay is energized as before described, and the alarm terminates.

Inadvertent actuation of an alarm of a given zone can be terminated locally by a key reset operation. The user switches the access key switch to the access position — requiring, of course, the use of the key issued for that switch.

Note that contact DR-1C of the detecting relay is closed upon deenergization of coil DR-1. Diode D2-1 then connects terminal GR through line 227 and buss 2 to terminal 269*a* of coil 269 of a key reset relay. Terminal 269*b* thereof is connected to common. When the authorized user actuates the access key switch 220 to the "access" position, closing contacts 220*b*, following an inadvertent alarm condition, the positive volage at terminal WH is applied through leads 222 and 224, the GR terminal lead 225, diode D2-1, lead 227 and buss 2 to the terminal 269*a* of coil 269 of the key reset relay. The latter switches its contact DR-1 to position DR-1A to connect junction C through capacitor 264, junction 241, lead 242, junction 244, and lead 246 to terminal 172*b* of coil 172 of the reset relay. This results in re-energizing coil DR-1 of the detecting relay and terminating the alarm state of zone 1. Capacitor 268 provides a holding function for coil 269 of the key reset relay to assure that reset of the detecting relay is accomplished. Capacitor 264, on the other hand, is connected in series in the energizing circuit for coil 172 of the reset relay to limit the time duration of its energization by the key reset operation, so tha the reset function is only momentary. This assures that the system cannot be held a continuous reset state in the key reset operation, since this obviously would frustrate the security sensing and alarm indication functions.

The access key switch 220 in the "access" position, at which contacts 220*a* and 220*b* are closed, bypasses the sensor switches 216, 218 . . . and through leads 212 and 214, completes the circuit between BL and BR for energizing coil DR-1. Closed contact 220*b*, through leads 222 and 224, applies the positive voltage from terminal AC-1 for transmitting the access condition to the central. The central thus is assured that the alarm condition was inadvertent and was corrected by an authorized person through the key reset operation.

It is also important to note that the key reset is effective only for a zone actually in an alarm condition. As to other zones, the corresponding contacts, e.g. DR-2B to DR-10B are opened by their respective detecting relays DR-2 to DR-10 and hence no reset voltage can be supplied from a zone not in alarm for resetting the zone 1 which is in alarm.

Note that if any tamper operation permanently damages wires, e.g. by cutting, or if an intruder leaves a door open, etc., the central must dispatch a repairman to the remote. From FIGS. 2A and 2B, the tamper and SU conditions are joined as a single output to the central. This is sufficient, since an actual tamper condition as to one zone — e.g. switch T, or cutting of wires to terminals R and BL — will cause an alarm and be indicated as such for that zone, whereas tamper alarm indications relating to the cables (226 and 228) leading to a unit 38, or to door tamper switch 230 of a unit 38 will show an alarm for all zones services by a unit 38, at the central. Tamper alarm indications from loss of AC power (SU) for the multiplexer or any master unit 38 will be indicated and readily interpreted as well at the central.

Figure 10:
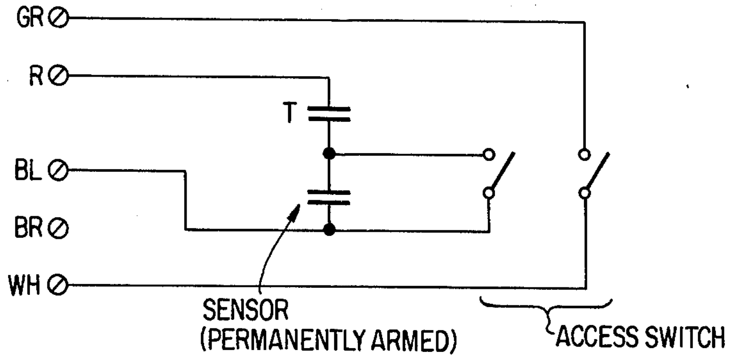
FIG. 10 illustrates a modification of a protection sensing circuit of FIG. 9C, and FIGS. 11A and 11B comprise a schematic block diagram and a circuit schematic, respectively, of a technique for deriving outputs from a selector button call director employed in the telephone switching system of the security control and alarm system of the invention.

The system of the invention is highly versatile and flexible, permitting many direct modifications to customer requirements. Already noted is the ability to provide permanently armed, maximum security areas with a zone by connection of sensors in series with tamper switch T between the GR and R terminals of FIG. 9C and specifically shown in FIG. 10. A special key lock switch must be employed at all times as indicated at 280, to gain access to such an area, to avoid setting off an alarm. If desired, an access indication can be transmitted to the central as well by lead 292, switch 290 and lead 294 between the WH and GR terminals. Of course, a separate zone entirely could be employed, to distinguish such an area from a normal zone.

A regular zone moreover can be fully armed at all times by open circuiting lead 210, e.g. by clipping out the diode D-3. This eliminates the jumping of terminals BL and BR by contacts A/D-1 of the arm/disarm relay which are closed in the disarmed state of the system (during which the arm/disarm relay is energized).

If a given customer does not wish to have an alarm indicator, e.g. a bell, sounded in the area of his zone, diode D-1 of his zone (e.g. diode D-1 for zone 1) may be clipped to open circuit the lead from the detecting relay contact DR-1B to buss 7 and thus eliminate activating the alarm bell despite the alarm condition occurring in that zone. The alarm indication nevertheless will be transmitted to the central.

As noted, various types of sensors may be employed, including the discussed intrusion detection types as well as fire and other sensor types. Moreover, the key access switch may be a key operated type, a digital pushbutton operated type, or other. Further, time-controlled and/or stepping relay type switches may be employed, such as provide only an automatically limited time period of the "access" state with automatic return to the "secure" state, or which permit resetting the "secure" state from within the premises from the "access" state after a tenant has entered his premises. In either case, return to "access" is necessary to exit the premises, when armed, without setting of the alarm.

Figure 11A:
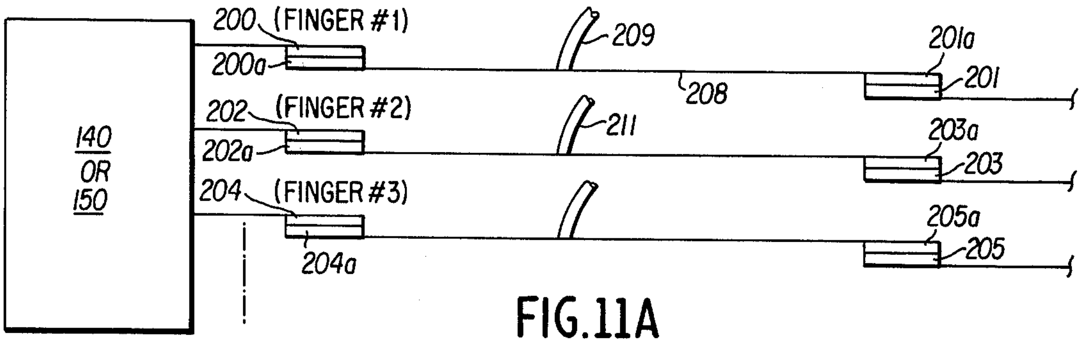
Figure 11B:
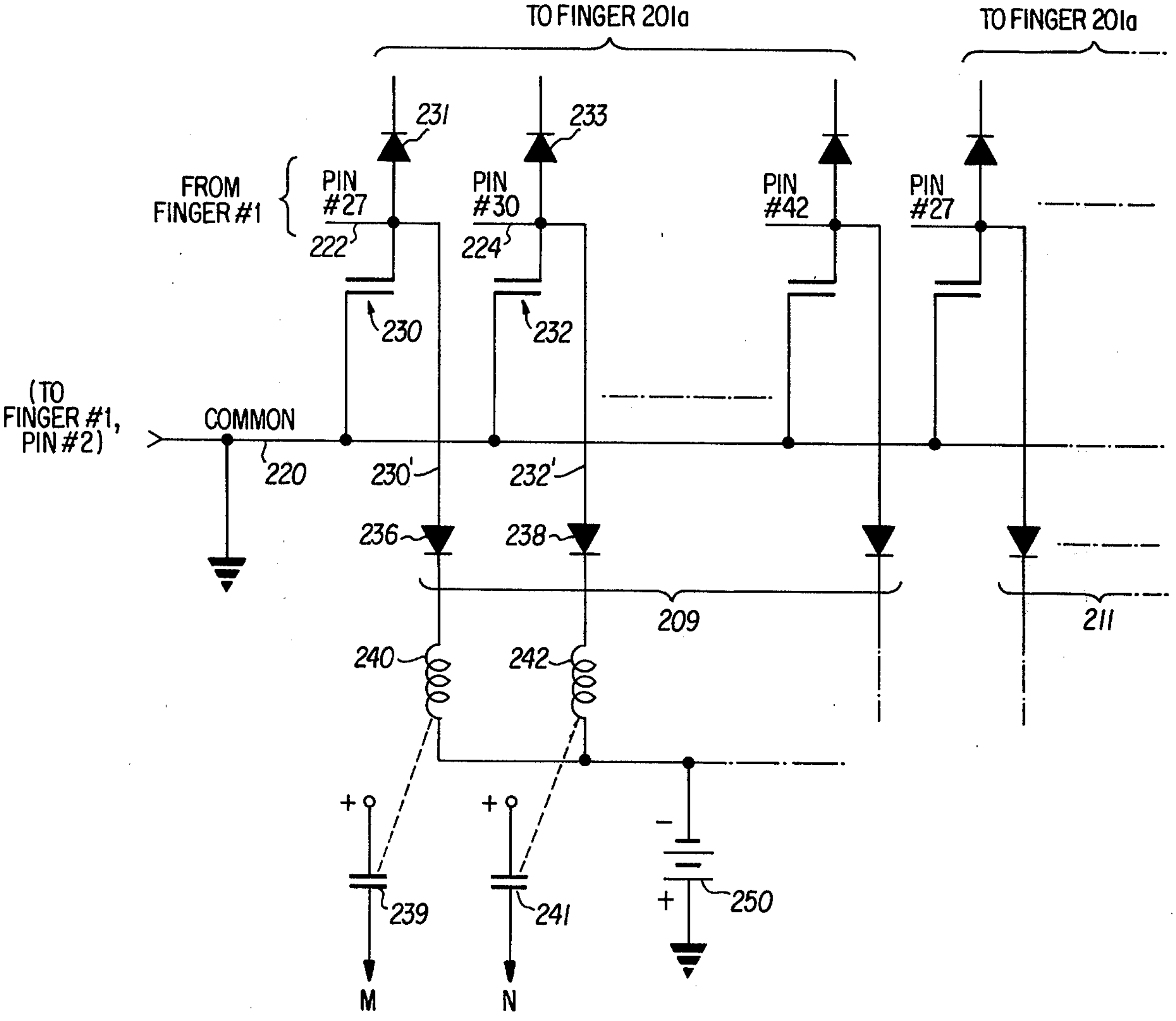

FIGS. 11A and 11B comprise a more detailed schematic of the means for deriving outputs from the selector buttons such as 144 and 146 of call directors 140 and 150, respectively, in the telephone switching system 18 as shown in FIG. 8. Particularly, as is well known, conventional call directors of the type here considered include a number of fingers such as 200, 202, 204, each of which includes a large number of pin connectors corresponding to conductors associated with respective ones of a predetermined group of the pushbuttons of the call director. The number of fingers thus depends upon the number of selector buttons of a given call director. These fingers then interconnect to mating fingers 201, 203, 205 which join to the connecting cables in the building.

One conventional type of call director and finger connector arrangement includes one such finger servicing six selector buttons. In a particular such finger, pin connectors No. 27, No. 30, No. 33, No. 36, No. 39 and No. 42 conduct output signals indicating the depression and thus selection of a corresponding selector button. Where multiple fingers are required for a large capacity call director, pin No. 2 from finger No. 1 is the telephone system common, or ground, potential.

Deriving the necessary outputs as discussed in relation to FIG. 8 can be performed in accordance with the circuit of FIG. 11*a* without altering any of the telephone-company supplied equipment.

In FIG. 11*a*, the fingers 200, 202, 204 are separated from their normal mating fingers 201, 203, 205, and corresponding jumper leads 208, 210 and 212 with associated fingers 200*a* and 200*b* are used to reconnect them. The necessary outputs for the present system then are derived from the cable 208, as generally shown at 209. The outputs 209 are derived and employed as shown in FIG. 11B.

In FIG. 11B, lead 220 is the common (shown grounded) as derived from No. 2 pin connector of finger No. 1 (e.g., finger 200 of FIG. 11A). Leads 222, 224 . . . correspond to the noted six terminals of each finger (contacts No. 27, No. 30 . . . No. 42) which provide an output when the corresponding button is depressed. The button contacts are shown at 230, 232 . . . . Diode isolators 231, 233, . . . connect those outputs through connecting leads to corresponding pin connectors of the auxiliary finger 201*a* to complete the normal connection to the mating finger 201. Output leads 230′, 232 . . . correspond to the outputs 209 of FIG. 11A and are connected through isolation diodes 236, 238 . . . to corresponding relay coils 240 and 242. The coils then are connected in common to the negative terminal of a DC source 250, the positive terminal of which is connected to telephone system ground.

Depression of a given selector button, such as 230 or 232, results in energizing of the corresponding coil 240 or 242 from the DC source 250. The relay coils 240 and 242 thus can close corresponding contacts 239 and 241 to provide outputs such as the outputs M and N of FIG. 8. The coils 240 and 242 in fact will be seen to correspond to the relays generally labelled M and N in FIG. 8, which are described as responding to the actuation of selector buttons of the call director 150 for closing their respective contacts and selectively supplying the enable signals to the panels 130 and 132. FIGS. 11A and 11B therefore will be understood to explain in greater detail the manner of that circuit implementation in FIG. 8.

From the foregoing, it will be apparent to those skilled in the art that numerous modifications and adaptations of the system of the invention may be made, and thus it is intended by the appended claims to cover all such modifications and adaptations which fall within the true spirit and scope of the invention.

What is claimed is:

1. A security control and alarm system having a central station communicating with at least one station for receiving signals indicating security conditions, including alarm and access conditions, sensed at the remote station and for transmitting controls to the remote station wherein:

said remote station comprises:

a master control unit communicating with plural zones to be protected, each said zone including at least one sensor device and an access switch selectively settable to a desired one of secure and access positions and operative in the access position to shunt the sensor device, said master control unit including means responsive to arming and disarming controls from said central station to establish armed and disarmed states of said unit and being enabled in said armed state to respond to activation of said sensor device, means connecting said sensor device of each said zone to said master control unit, said master control unit, when armed, being enabled to respond to activation of said sensor device of a given said zone for the secure position of said access switch to generate an alarm signal associated with the said zone, and a multiplex-transmitter/receiver communicating with said master control unit, said multiplexer thereof including a multiplex point for each said zone for receiving an alarm signal for the corresponding zone and for transmitting each received zone alarm signal as a corresponding signal of a multiplex wave form to said central station, and said central station, and said central station comprises:

a multiplexer-transmitter/receiver for receiving the multiplex wave form transmissions from said remote station and for selectively transmitting a multiplex wave form to said remote station, means for indicating an alarm condition for each zone for which a corresponding said alarm signal is present in the received multiplex wave form, and means for selectively producing plural controls, including at least said arming and disarming controls, and supplying said controls as inputs to corresponding multiplex points of said central station multiplexer-transmitter for transmission as corresponding signals of the multiplex wave form to said remote station, and said remote station further comprises:

plural devices to be controlled, including at least said means of said master control unit responsive to said arming and disarming controls, said multiplexer-receiver of said remote station producing a control output corresponding to each control signal of the multiplex wave form received from said central station, and means responsive to each said control output for controlling the respectively associated device to be controlled.

2. A system as recited in claim 1 wherein said selective producing means of said central station means for producing a system test control, said remote station includes a system test device to be controlled comprising means for applying a test signal input to each multiplexer point of said multiplexer of said remote station, and said means responsive to the system test control output controls said system test device to apply a system test signal to each multiplexer point of said remote station multiplexer for transmission of system test signals at all multiplexer points of said remote station multiplexer to said central station.

3. A system as recited in claim 1 wherein said remote station includes an entrance door and said device to be controlled comprises an electrically operated lock for said entrance door and wherein said selective control producing means of said central station comprises means for generating a door open control, and said control output producing means of said remote station responds to a signal of the received multiplex wave form corresponding to the door open control to produce a door open control output for actuating said door unlocking mechanism.

4. A system as recited in claim 1 wherein:

said master control unit of said remote station includes means for maintaining an alarm condition in accordance with said master control unit responding to activation of said sensor device for said secure position of said access switch, and said selective control producing means of said central station includes means for producing a reset control for transmission as a corresponding signal of the multiplex wave form to said remote station, and said control output producing means of said remote station produces a reset control output in response to receipt of the corresponding reset signal of the received multiplex wave form, and said control device of said remote station comprises means for resetting said alarm maintaining means of said master control unit in response to the reset control output.

5. As system as recited in claim 1 wherein:

said master control unit of said remote station further responds to movement of said access switch to said access position to produce an access signal for the corresponding zone, said multiplexer of said remote station includes first and second multiplex points corresponding to access and alarm conditions of each said zone for transmitting corresponding access and alarm signals for each said zone in multiplex wave form in said central station, and said central station indicating means further includes means for indicating an access condition for each said zone, and said multiplexer-receiver of said central station responds to the received access and alarm signals of said multiplex wave form transmissions from said station to selectively energize the corresonding access and alarm condition indicating means for the corresponding said zones.

6. A security and alarm system as recited in claim 1 wherein:

said master control unit includes power source terminals for connection to a source of power and relay means associated with each said zone, said means connecting said at least one sensor device of each said zone to said master control unit includes a tamper loop including first and second wires connected in series with said relay means and said sensor device and to said power source terminals to normally maintain energization of said detecting relay, activation of said at least one sensor device of a given said zone opening said series circuit and de-energizing said detecting relay thereby to generate a zone alarm signal for the corresponding zone and cutting of said first and second wires of said tamper loop de-energizing said detecting relay and producing an alarm signal for said zone at said master control unit, a cable for connecting said master control unit to said transmitter means of said remote station to provide said communicating therebetween, said tamper loop including third and fourth wires in said cable whereby cutting of said third and fourth wires of said tamper loop open circuits said energizing circuit for the detecting relay of all of said zones associated with said master control units thereby to generate an alarm signal for all of said zones at said master control unit, and said central station includes means for receiving each said zone alarm signal and indicating the alarm condition of said zone, for all of said zones associated with said master control unit.

7. A security control and alarm system as recited in claim 6 wherein there are provided plural said master control units at a given, said remote station and said transmitter means of said remote station transmits a corresponding zone alarm signal for each of said plural master control units to said central station.

8. A system as recited in claim 7 wherein there is further provided for each said master control unit, a second tamper loop extending from said transmitter means to each associated master control unit, each said second tamper loop including first and second wires connected together at the corresponding said master control unit and plural said second tamper loops being connected in series at said transmitter means, said plural second tamper loops being normally energized to produce a first output, and cutting of any thereof terminating said first output and producing a second output comprising an alarm signal, said transmitter means transmitting said alarm signal resulting from cutting of second tamper loops to said central station, and said receiving and indicating means of said central station responding thereto and indicating a corresponding alarm condition.

9. A system as recited in claim 6 wherein each said zone includes a tamper detection switch, associated with said access switch, and normally closed in the absence of tampering with said access switch to complete the series energizing circuit for said detecting means, and a further sensor device in series circuit with said tamper detection switch, and said master control unit supplies energizing power to said detecting means and said series connected tamper detection switch and said tamper switch armed at all times.

10. A system as recited in claim 6 wherein each of said zones includes first, second, third and fourth terminals, said sensor device being connected between said first and second terminals, and a tamper switch connected between said third and fourth terminals and normally closed to connect said third and fourth terminals in the absence of tampering with said switch, first, second, third and fourth conductors connected to said first, second, third and fourth terminals, respectively, a relay detecting means connected in series circuit in said fourth conductor, and a diode connected in series circuit in said third conductor, said selective arming and disarming means of said master control unit is normally energized to connect said second and third terminals and shunt said sensor device, and said master control unit of said remote station responds to said arming control to selectively deenergize said arming/ disarming means and disconnect said second and third terminals thereby to require said sensing device to complete said connection between said second and third terminals, and for at least one zone, said diode of said third conductor being removed to prevent disarming of said sensor device of that zone and maintain that said zone permanently armed.

11. A security and alarm system as recited in claim 1 wherein:

said multiplex-transmitter of said remote station provides continuous transmission of said multiplex waveform to said central station, said master control unit of said remote station, both where armed and disarmed, being enabled to respond to the access signal for the associated zone to said multiplex-transmitter of said remote station, and said multiplex-transmitter of said remote station including a further multiplex point for each said zone for receiving said access signal, and said indicating means of said central station further includes means for indicating an access condition for each said zone and responsive to an access signal in the multiplex waveform received from a remote station to indicate the access condition for that zone in each of the armed and disarmed states of the master control unit of the remote station.

12. A security control and alarm system having a central station communicating with at least one remote station for receiving indications of security conditions, including alarm and access conditions, sensed at the remote station and for transmitting controls to the remote station, comprising a master control unit at the remote station communicating with at least one zone to be protected, said zone including at least one sensor device, and an access switch selectively settable to a desired one of secure and access positions and operative in the access position to shunt the sensor device, said master control unit including means responsive to arming and disarming controls from said central station to establish armed and disarmed states of said unit and being enabled in said armed state to respond to activation of said sensor device, means connecting said at least one sensor device of each said zone to said master control unit, said master control unit, when armed, being enabled to respond to activation of said at least one sensor device of a given said zone for the secure position of said access switch for generating an alarm signal associated with said zone, transmitter means at said remote station communicating with said master control unit for receiving said alarm signal for said zone and transmitting a corresponding zone alarm signal to said central station, means at said central station for selectively transmitting arming and disarming controls to said remote station for selectively arming and disarming said master control unit thereof, means at said central station for receiving a zone alarm signal from said remote station, and for indicating the alarm condition of said zone, and means at said central station for selectively transmitting a system test control signal to said remote station, said remote station including means responsive to a received system test control signal to apply a test signal corresponding to said alarm signal for said zone to said remote station transmitter for transmission to said control station receiving and indicating means.

13. A system as recited in claim 12 wherein said master control unit communicates with plural zones to be protected, said receiving and indicating means of said central station includes plural said means for selectively indicating the alarm condition of each said zone, and said system test control signal responsive means of said remote station responds to the received system test control signal to apply a test signal corresponding to an alarm signal to each said zone for transmission to said central station.

14. A system as recited in claim 13 wherein:

said master control unit at the remote station responds to the access position of each said access switch for each said zone to generate a corresponding access signal, said transmitter means of said remote station receives both said alarm signals and said access signals from each of said zones and transmits respectively corresponding zone alarm and access signals to said central station, and said system test control signal responsive means of said remote station applies a test signal corresponding to both said alarm signal and said access signal for all of said zones simultaneously for transmission to said remote station transmitter.

15. A security control and alarm system having a central station for communicating with at least one remote station for receiving indications of security conditions sensed at the remote station and for transmitting controls to the remote station, comprising:

a master control unit at the remote station communicating with plural zones to be protected, each said zone including at least one sensor device, means connecting said at least one sensor device of each said zone to said master control unit and said master control unit including a detecting relay associated with each said zone and connected in series energizing circuit with said at least one sensor device of each said zone and a tamper loop further connected in series therewith comprising first and second wires completing a series connection of said relay means and said sensor device to a power source, to normally maintain energization of said detecting relay, for each of said zones, either of activation of the sensor device and cutting of the tamper loop first and second wires of a given said zone opening said series circuit and deenergizing said detecting relay thereby to generate an alarm signal for the corresponding zone, transmitter means at said remote station communicating with said master control unit for receiving alarm signals for the corresponding zones thereof and for transmitting the said corresponding zone allarm signals to said central station, a cable for connecting said master control unit to said transmitter means to provide said communicating therebetween, said tamper loop including third and fourth wires in said cable whereby cutting of said cable cuts said third and fourth wires of said tamper loop and open circuits said energizing circuits for the detecting relays of all of said zones and produces zone alarm signals for all of said zones associated with said master control unit, and said central station includes means for receiving each said zone alarm signal and indicating the alarm condition of said zone, for all of said zones associated with said master control unit.

16. A security control and alarm system as recited in claim 15 wherein there are provided plural said master control units at a given, said remote station and said transmitter means of said remote station transmits the zone alarm signals for each of said plural master control units to said central station.

17. A system as recited in claim 16 wherein there is further provided for each said master control unit, a second tamper loop extending from said transmitter means to an associated master control unit, each said second tamper loop including first and second wires connected together at the corresponding said master control unit and plural said second tamper loops being connected in series at said transmitter means, said plural second tamper loops being normally energized to produce a first output, and cutting of any thereof terminating said first output and producing a second output comprising an alarm signal, applied to said transmitter means for transmission to said central station, and said receiving and indicating means of said control station responding thereto and indicating a corresponding alarm condition.

18. A system as recited in claim 15 wherein:

each said zone includes a key access switch operable in a secure position to enable response of said master unit to activation of said sensor, and in an access position to disable response of said master unit to said activation and a tamper detection switch associated with said key access switch and closed in the absence of tampering with said key access switch to complete the series energizing circuit for said detecting relay and a further sensor device in series circuit with said tamper switch, said master control unit supplying energizing power to said detecting relay and said series connected tamper switch and further sensing device to maintain said further sensing device and said tamper switch armed at all times.

19. A system as recited in claim 15 wherein each of said zones includes first, second, third and fourth terminals said sensor device being connected between said first and second terminals, and a tamper switch connected between said third and fourth terminals and normally closed to connect said third and fourth terminals in the absence of tampering with said switch, first, second, third and fourth conductors connected to said first, second, third and fourth terminals, respectively, said detecting relay being connected in series circuit in said fourth conductor, and a diode connected in series circuit in said third conductor, said master control unit further including selective arming and disarming means normally energized to connect said second and third terminals and shunt said sensor device, and said central station including means for transmitting an arming control to said remote station and said master control unit of said remote station responding to said arming control to selectively de-energize said arming/disarming means and disconnect said second and third terminals thereby to require said sensing device to complete said connection between said second and third terminals, and for at least one zone, said diode of said third conductor being removed to prevent disarming of said sensor device of that zone and maintain that said zone permanently armed.

* * * * *

UNITED STATES PATENT AND TRADEMARK OFFICE

CERTIFICATE OF CORRECTION

PATENT NO. : 4,023,139

DATED : May 10, 1977

INVENTOR(S) : GENE SAMBURG

It is certified that error appears in the above-identified patent and that said Letters Patent are hereby corrected as shown below:

Column 1, line 23, after "hours" (and before the period), insert --and whose function is to monitor the individual coming and going after business hours--.
Column 6, line 34, "controls" should be --remote--.
Column 14, line 12, "A.D." should be --A/D--.*
Column 16, line 37, "216,218." should be --216,218...--.

Signed and Sealed this

*thirtieth* Day of *August 1977*

[SEAL]

*Attest:*

RUTH C. MASON
*Attesting Officer*

C. MARSHALL DANN
*Commissioner of Patents and Trademarks*